United States Patent [19]

Goede et al.

[11] Patent Number: 4,527,894
[45] Date of Patent: Jul. 9, 1985

[54] METHOD AND APPARATUS FOR MEASURING THE VELOCITY OF MOVED OBJECTS OR THE LIKE

[75] Inventors: Simon Goede, Wetzikon; Peter Hauser, Uster; Silvio Mira, Wermatswil, all of Switzerland

[73] Assignee: Zellweger Uster Ltd., Uster, Switzerland

[21] Appl. No.: 424,920

[22] Filed: Sep. 27, 1982

[30] Foreign Application Priority Data

Dec. 17, 1981 [CH] Switzerland ............ 8062/81

[51] Int. Cl.³ .................... G01P 3/36; G01C 3/08
[52] U.S. Cl. ............................ 356/28; 356/5
[58] Field of Search ...................... 356/28, 5

[56] References Cited

U.S. PATENT DOCUMENTS

| | | | |
|---|---|---|---|
| 3,057,071 | 10/1962 | Sinn | 356/28 |
| 3,503,680 | 3/1970 | Schenkerman | 356/5 |
| 3,690,767 | 9/1972 | Missio et al. | 356/28 |
| 3,809,477 | 5/1974 | Russell | 356/5 |
| 4,184,767 | 1/1980 | Hughes et al. | 356/5 |
| 4,311,384 | 1/1982 | Keene | 356/5 |
| 4,371,261 | 2/1983 | Tsuji | 356/4 |
| 4,453,825 | 6/1984 | Buck et al. | 356/5 |

FOREIGN PATENT DOCUMENTS 42805 12/1981 European Pat. Off. ............ 356/28

OTHER PUBLICATIONS

Reno et al., RCA Technical Notes #962, 6/17/74.

Primary Examiner—S. C. Buczinski
Attorney, Agent, or Firm—Werner W. Kleeman

[57] ABSTRACT

The invention relates to a method and apparatus for measuring the velocity of a moving object. Measuring beams composed of sequences of optical pulses are directed towards the object which is to be measured and follow such object. Based upon transit time measurements of reflected pulses there are formed distance values and distance difference values. While taking into account the time interval of the pulse sequence there are computed velocity measuring values and velocity values computed from homogeneous groups of values are displayed as reliable velocity values. By means of a measuring beam deflection system there are directed measuring beams into defined solid angle sectors towards the object which is to be measured, and reliable velocity measuring values computed from homogeneous groups of measuring values from the measuring channels correlated to the individual solid angle sectors are displayed as binding or valid velocity measuring values if there is present a confirmation of the value from further solid angle sectors.

22 Claims, 29 Drawing Figures

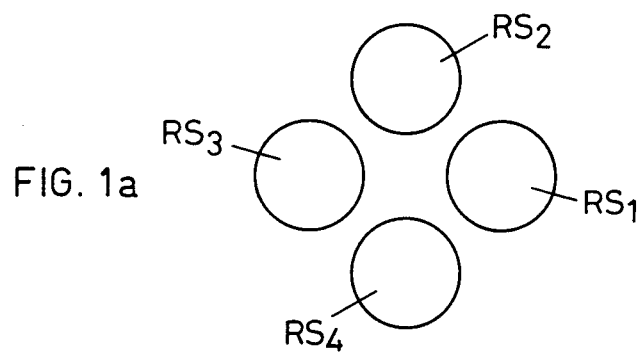
FIG. 1a
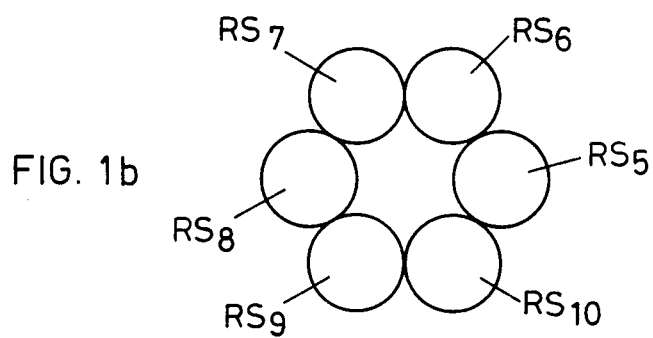
FIG. 1b
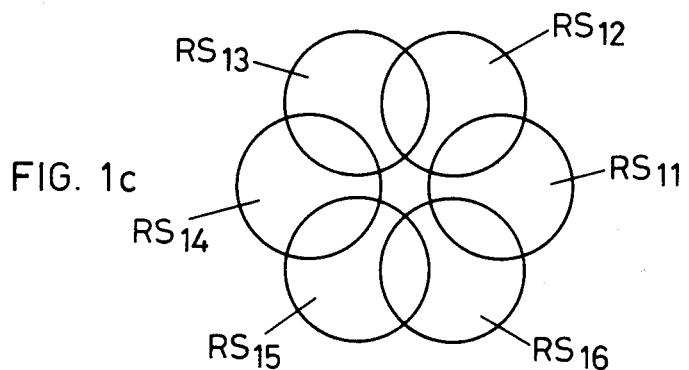
FIG. 1c
FIG. 1

METHOD AND APPARATUS FOR MEASURING THE VELOCITY OF MOVED OBJECTS OR THE LIKE

BACKGROUND OF THE INVENTION

The present invention relates to a new and improved method and apparatus for measuring the velocity of moving objects or the like.

There is already known to the art both a method for space monitoring by means of pulsed directional radiation and also an apparatus for the performance of such method. Significant in this regard is International Patent Publication No. WO 80/02764, dated Dec. 11, 1980, and the cognate U.S. Pat. No. 4,319,332, granted Mar. 9, 1982. In such documents there is disclosed, among other things, a method which is manifested by the features that at least one virtual line or virtual surface is correlated to a roadway or the like, there is detected the crossing of a virtual line or the penetration of a virtual surface by at least one vehicle, and such event is evaluated and/or recorded.

There is further disclosed the manner in which, with the aid of measuring beams, there can be measured a moving object as concerns its movement, trajectory and/or velocity and/or acceleration. Additionally, in such documents there is disclosed a beam splitter system for the surface-like or spatial beam splitting or beam fanning.

With the aid of the objects of such prior art, both as concerns the method and apparatus aspects, it is obvious for accomplishing velocity measurements of moving objects to direct pulsed optical measuring beams from a lateral position towards the path of travel of such object, and such measuring beams, starting from at least one point, are directed in at least one direction towards such path of travel.

By measuring and evaluating the transit or travel times of optical pulses which have been reflected at the moving objects it is possible to measure coordinates of such objects at different points in time. From such coordinates or the distance vectors to the reflection locations, on the one hand, and the timewise course of the measurements, on the other hand, it is possible to compute velocity values and to correlate such to predetermined objects.

The measuring beams which are to be directed towards the path of travel of the object which is to be detected can emanate from a point and can be chosen to extend at a predetermined angle p with respect to one another. Also, the measuring beams emanating from a plurality of points, can be chosen to extend parallelly at defined spacings from one another. Preferably, the directions of the measuring beams are chosen such that they extend in a single plane which is disposed at least approximately parallel to the path of travel of the object to be detected.

What is disadvantageous with a method and apparatus of the previously described type is that, the measuring beams which are stationary in space are intersected, or cut, during the measurement by the moving objects, whereby the objects to be measured are detected. For the timewise exact determination of the entry of a relatively rapidly moving object into a measuring beam it is necessary for the pulse frequency of such measuring beam to possess a sufficiently high value, so that the resultant quantization error in the determination of the entry time point is smaller by at least one order of magnitude than the time duration which is needed for moving through the path or distance between two successive measuring beams.

For the practical application of such equipment in public traffic, for instance for monitoring motor vehicle traffic, the permissible pulse frequency of the measuring beams which is to be employed, with a predetermined pulse output, is limited to a certain upper threshold value by virtue of the so-called eyesight or eye safety regulations. It has been found that the velocity measuring range of practical constructions of equipment for velocity measurements in accordance with the aforementioned method, are practically too markedly limited because of the required pulse frequency, on the one hand, owing to the quantitization errors which must be observed and, on the other hand, because of the eye safety regulations which must be complied with. Therefore, velocity measuring methods and equipment for the performance thereof working in accordance with the described principle, are too markedly limited or, in fact, unusable for certain fields of application.

Additionally, from German Patent Publication No. 2,723,584, published Nov. 30, 1978, there is known a prior art velocity measuring apparatus. The drawback discussed in conjunction with the first mentioned patent is avoided with this German Patent Publication in that, the object to be measured is continuously followed or tracked by a measuring beam and is simultaneously measured by means of such measuring beam. Here, as long as the angle between the direction of movement of an object which is to be detected and the measuring beam transmitted towards such object is sufficiently small, i.e. approximately below 10°, and, if the accuracy requirements for the velocity measurement are not extremely high, for instance must only be accurate to about 1.5%, then the aforementioned angle need not be taken into account. The velocity of the object then can be directly determined from the change of the distance to the object measured with each pulse and resulting during the optical tracking of the object. The point in time of entry of the object into the measuring beam, with this prior art method, is meaningless for the measurement accuracy, and there can be selected for the pulse frequency a value which has no detrimental consequences as concerns protecting the eyes of human beings.

But also this last-mentioned equipment does not operate faultlessly under all practical conditions. Among others, the following drawbacks are particularly worthy of mention:

1. It is presupposed or assumed when using such velocity measuring apparatus that the measuring beam always impinges at the same place or spot upon the object to be measured during the entire measurement operation. Since such type of velocity measuring apparatus, according to a preferred construction, constitutes a manually held piece of equipment, somewhat similar in its design to a photographic camera, it is impossible to avoid shifting of the impact point of the measuring beam at the object to be measured during the measuring operation. Above all, with an irregularly configured or contoured object, such as motor vehicles, such has the effect that a sequence of distance values to different impact points at an object to be measured undesirably constitutes the basis of the velocity determination. This, of course is associated with a considerable ambiguity in the reliability of the measurement result. In the aforementioned German Patent publication there is specifically mentioned the known Gauss' error squaring method as a possibility of obtaining a reliable final measurement result from a multiplicity of unreliable measurement results. However, the mentioned German Patent publication does not disclose a more exact method for determining the reliability of individual measurement results, nor does it disclose a technique for eliminating measurement results which arise during the shifting of the impact point of the measuring beam.

2. Particularly if there must be accomplished velocity measurements in the presence of dense or heavy traffic, in other words when, viewed from the standpoint of the measuring apparatus, a plurality of objects, here vehicles for instance, move within a relatively narrow angular range, it is impossible to preclude that the measuring beam, during a measurement operation will at least periodically impinge upon a number of objects having different velocities. Since, in such case, the formed distance values to the objects are to be considered as hybrid values, the thus derived velocity values likewise must be evaluated as hybrid values of the velocities of the individual vehicles. A velocity measuring apparatus where such hybrid value formation can occur in an uncontrolled fashion, based upon measurements to different objects, i.e. vehicles, is however practically unusable as a reliable means for monitoring traffic, because of the possibility of an alleged traffic violator to legally challenge the measurement results in court. In the aforementioned publication there has not been disclosed in any manner how the formation of such hybrid values can be detected and, if desired, suppressed or eliminated.

SUMMARY OF THE INVENTION

Therefore, with the foregoing in mind it is a primary object of the present invention to provide a new and improved method of, and apparatus for, measuring the velocity of moving objects in a manner not afflicted with the aforementioned drawbacks and limitations of the prior art proposals.

Another and more specific object of the present invention aims at providing a new and improved method of, and apparatus for, enabling the performance of reliable velocity measurements at moving objects, which functions in accordance with the principle of pulsed directional radiation, wherein the required safety regulations for protecting the eyes of human beings can be positively and satisfactorily complied with, and there can be obtained the measuring accuracy required in practice without there being placed any impermissible limitations upon the velocity measurement range.

A further important object of the present invention, and in keeping with the immediately preceding object, is to provide a method and apparatus for reliably measuring the velocity of moving objects, wherein there can be accurately and positively detected measuring errors caused by shifting of the impact or impingement point of the measuring beam upon the object to be measured during the measuring duration and there can be positively and effectively eliminated measuring values predicated thereon, and, furthermore, ambiguous measurements caused by at least timewise successive measurements of a number of objects, typically vehicles, arising during the measurement duration can be detected and measuring values predicated thereupon can be effectively suppressed.

A still further significant object of the present invention is directed to a new and improved method of, and apparatus for, reliably, accurately and efficiently measuring the speed of moving objects, and which apparatus is relatively simple in construction and design, extremely reliable in operation, not readily subject to breakdown or malfunction, and requires a minimum of maintenance and servicing.

Yet a further significant object of the present invention is directed to a new and improved construction of apparatus for measuring the velocity of moving objects, especially vehicles, by means of pulsed optical radiation, which apparatus is relatively economical to manufacture, safe and quite easy to use, and provides for accurate measurement results which can not readily be challenged by traffic violators, and therefore affords a reliable device for prosecuting such traffic violators.

Now in order to implement these and still further objects of the invention, which will become more readily apparent as the description proceeds, the inventive method for measuring the velocity of a moving object by means of pulsed optical radiation is manifested by the features that, measuring beams are aligned towards an object which is to be measured as concerns its velocity, the measuring beams being formed by a sequence of optical pulses and being targeted towards the object which is to be measured. From the transit or travel times of such pulses to the object and following the reflection of the pulses at the object back to the site of the transmission of the pulses there are formed distance measuring values. From the distance measuring values there are formed distance differences and by dividing the distance differences by related time spans there are formed and displayed velocity values for the object whose velocity is to be measured.

As alluded to above the invention is not only concerned with the aforementioned method aspects, but also pertains to a new and improved construction of apparatus for the performance thereof. According to the invention the velocity measuring apparatus is manifested by the features that, between a pulsed light source and a transmitter optic or optical system there is rotatably arranged with respect to the optical axis of the transmitter optic a transparent disk which is inclined with regard to the optical axis of the transmitter optic or optical system, in order to deflect into different solid angle sectors measuring beams transmitted by the light source.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 1 illustrates three exemplary arrangements of beam cross-sections, and wherein specifically:

FIG. 1a depicts four non-overlapping solid angle sectors;

FIG. 1b depicts six contacting solid angle sectors; and

FIG. 1c illustrates six partially overlapping solid angle sectors;

FIGS. 14-1/14-2 illustrate a flow chart of the main program for six channel measurement;

FIGS. 14A-1/14A-2 illustrate a flow chart of the main program for single-channel measurement;

FIGS. 16-1/16-2 illustrate a flow chart for the channel evaluation;

DETAILED DESCRIPTION OF THE PREFERRED EMBODIMENTS

Figure 2:
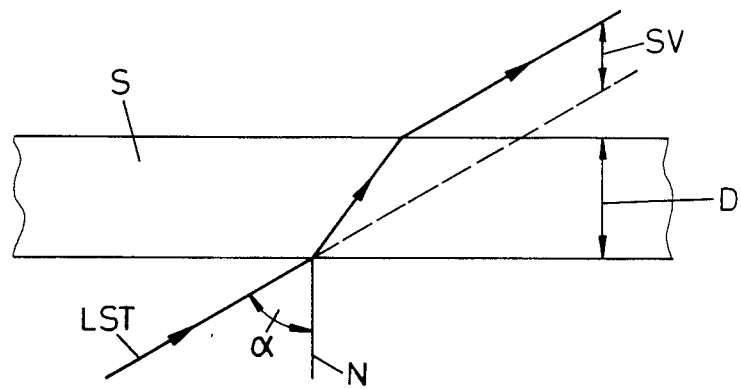
FIG. 2 illustrates the beam shifting or displacement of a light beam incident at an inclined glass plate.
Figure 3:
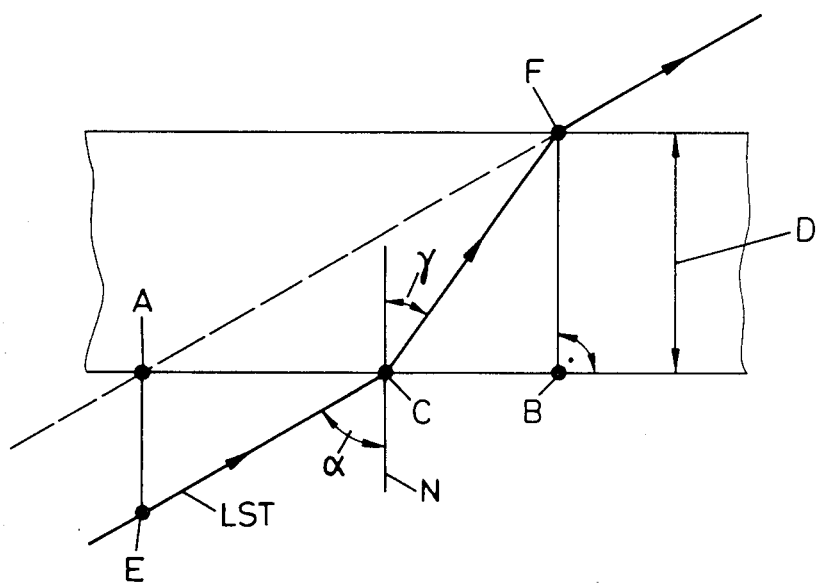
FIG. 3 illustrates the geometric correlations for the computation of the beam shift or displacement.

Describing now the drawings, it is to be understood that for purposes of describing the invention it will be assumed that, as an exemplary embodiment thereof, there should be measured the velocity of a travelling vehicle, for instance an automobile, by means of a sequence of optical pulses. To that end, there can be beneficially used visible or invisible, for instance infrared radiation. From the state-of-the-art there is known an apparatus by means of which such pulses can be produced, for instance, by a laser diode and directed by means of an optical arrangement towards a moving object, for instance an oncoming or an outbound automobile. At the impact or impingement location of the measuring beam composed of a sequence or train of optical pulses the pulses are reflected and a portion of the transmitted energy of the pulses arrives back at the site of the measuring apparatus. As likewise known from the prior art this measuring apparatus has operatively correlated therewith an optical pulse receiver of conventional design, by means of which it is possible to measure the transit or travel time of the pulses from the transmitter to the object to be measured and back again to the receiver.

While taking into account the propagation velocity and the measured transit or travel time, it is possible to compute a distance value for each received reflected pulse. If the measured object moves with uniform velocity and if the transmitted pulses follow one another at the same time intervals, then it will be apparent that, from the change of the distances measured at different but known times there can be determined the relative velocity of the measured object with respect to the measuring site or location.

For instance, if the nth-pulse results in a distance value $E_n$ and the n+1 pulse results in a distance value $E_{n+1}$ and if the time interval between the nth-pulse and the n+1-pulse equals $\Delta t$, then for the time span between the nth and the n+1-pulse there results a velocity measurement value according to the equation:

$$V = \frac{E_{n+1} - E_n}{\Delta t}.$$

Therefore, a sequence of strictly periodic pulses, with an object moving at a uniform velocity, should produce a sequence of equal velocity measuring or measurement values based upon the linearly ascending or descending distance values, respectively, in accordance with the direction of movement of the object.

Owing to the practically unavoidable fluctuations in the impact or impingement locations of the measuring beam at the object which is to be measured, there however result deviations in the distance values, notwithstanding constant or uniform velocity of the object. This phenomenon is particularly then pronounced if the impact or impingement locations of the measuring beam are disposed upon curved or inclined surfaces of the object which is to be measured. In this situation there can arise such great deviations of the measured velocity values from the true velocity that the corresponding velocity measuring values are afflicted with practically intolerable errors.

However, practical experience has demonstrated that with sufficiently high pulse frequency and with acceptable care in the handling of the measuring apparatus during the measuring interval or duration, there intermittently always occur time intervals containing sequences of relatively constant, and therefore, reliable velocity measuring values. However, the problem resides in ascertaining when such time intervals containing reliable measuring values actually arise and when they do not occur, so that, if desired, there can be automatically suppressed or eliminated inaccurate velocity measuring values.

A first characterizing feature of the invention therefore resides in the fact that, the continuously formed velocity measuring values are temporarily stored, prior to their evaluation and/or display, and thereafter checked to determine whether there has occurred therein a sequence of at least a predetermined number N of velocity measuring values within a fixed tolerance range directly in succession. Stated in another way, there is ascertained whether during the relevant measuring interval or duration there has occurred at least one time span or interval T containing relatively constat, i.e, homogeneous velocity measuring values, and which, thus, can be considered as reliable velocity measuring values. A measuring value emanating from at least one time span T containing reliable measurements or a mean value formed from the velocity measuring values computed or stored, as the case may be, within this time span, is then evaluated and/or displayed as a reliable velocity measuring value of the measured object, whereas the remaining measuring values are suppressed or extinguished, as the case may be.

A measuring beam of the heretofore described arrangement consists of a sequence or train of optical pulses which are transmitted in a predetermined direction. During each such pulse there is propagated from the light source, preferably a laser diode, a narrowly focused light beam throughout a predetermined solid angle sector towards the object which is to be measured.

According to an advantageous second embodiment of the invention, measuring beams are transmitted or radiated not only in a single solid angle sector, rather in a bundle of solid angle sectors which advantageously are closely situated next to one another or, in fact, can even partially overlap one another.

Now in accordance with the first mentioned feature of the invention, within one of each such solid angle sectors there is formed a velocity measuring value which originates from a time span T of reliable measuring values of such solid angle sector. One such measuring value thereafter is classified as a reliable sector measuring value.

According to a second feature of the invention also the thus obtained reliable sector measuring values of the individual solid angle sectors are, however, temporarily stored and brought into a certain relationship with regard to one another. According to this second feature of the invention, there is only then derived from the reliable sector measuring values a binding velocity measuring value of the measured object and such caused to be evaluated and/or displayed when there is present a predetermined minimum number of such reliable sector measuring values and their deviations from one another lie within a fixed tolerance range. Only in an exceptional case will there be received, within a certain measuring time, reliable sector measuring values from all of the measuring channels. Therefore, for the determination of a binding measuring value there is required only a certain minimum number of reliable sector measuring values, and which minimum number, for most fields of application, is smaller than the total number of measuring channels.

In this way there is obtained a high degree of binding or validity of the finally obtained velocity measuring values. It would be completely conceivable, in particular in the presence of dense traffic and relatively large measuring distances, that different measuring beams detect different vehicles. Thus, there would result different sector measuring values. Such different sector measuring values can never result in a binding velocity measuring value, since they are, of course, not correlated in a positive manner to a single predetermined object which is to be measured. In consideration of the fact that the measuring or measurement results must withstand legal challenge it is absolutely necessary to eliminate such situations.

Already the solution proposed according to the first feature of the invention affords an increased reliability of the finally obtained velocity measuring value in comparison to the state-of-the-art. However, only a combination of the first inventive feature with the second inventive feature also results in a finally displayed velocity measuring value which, for practical requirements, is sufficiently legally binding and not subject to legal challenge.

It is possible in known manner from the technology of Doppler radar-velocity measuring methods and measuring apparatuses, to utilize the occurrence or presence, as the case may be, of a reliable velocity measuring value of a measured object also for the direct or timewise-delayed triggering of a recording device, with the aid of which there can be visually detected a measured object. As the recording or imaging device there can be used, for instance, an electrically triggerable camera or an appropriate electronic video camera.

As an exemplary embodiment of a velocity measuring apparatus which can work with pulsed radiation in only one solid angle sector, and thus, possesses only one measuring channel, reference is here made to the aforementioned German Patent Publication No. 2,723,584. With such single-channel apparatus it is possible, in accordance with the teachings of the present invention, to quite appreciably improve upon the reliability of the measured velocity value by means of the previously explained checking of the velocity measuring values as to their uniformity or homogeneity.

In the discussion to follow there will now be described in detail an exemplary embodiment of apparatus which works with more than one solid angle sector.

In particular, FIGS. 1a, 1b and 1c illustrate respective cross-sectional views through the solid angle sectors, perpendicular to the symmetry axis, of a bundle or bunch of solid angle sectors for three exemplary embodiments of arrangements of such solid angle sectors.

According to the illustration of FIG. 1a, there are provided four solid angle sectors $RS_1$, $RS_2$, $RS_3$ and $RS_4$ which are essentially uniformly distributed with respect to the primary or main radiation direction HS and are not arranged so as to overlap one another.

In FIG. 1b there are provided six solid angle sectors $RS_5$, $RS_6$, $RS_7$, $RS_8$, $RS_9$ and $RS_{10}$ which are essentially uniformly distributively arranged with respect to the primary or main radiation direction HS and whose jacket or outer surfaces just touch one another.

According to FIG. 1c, there are likewise provided six solid angle sectors $RS_{11}$, $RS_{12}$, $RS_{13}$, $RS_{14}$, $RS_{15}$ and $RS_{16}$, which are arranged to be essentially uniformly distributed with regard to the primary or main radiation direction HS and whose solid angle sector-areas or cross-sections partially overlap, as shown.

Each of the solid angle sectors RS can have operatively correlated thereto a measuring channel MK, by means of which the incident reflections from the relevant solid angle sector are detected and evaluated. By means of each of the measuring channels there is obtained, during a measuring operation, periodic distance measuring values.

Exemplary embodiments of measuring channels are well known from the art. As to the processing of the incident reflections such will be described in greater detail hereinafter.

An apparatus for generating measuring beams which extend approximately as shown in FIGS. 1a, 1b or 1c, or in a similar fashion, in predetermined mutually correlated solid angle sectors, will now be described in conjunction with FIGS. 2, 3, 4 and 5.

FIG. 2 illustrates the manner in which a light beam LST, which is incident at a glass disk S at an incidence angle $\alpha$ to the normal N, and which glass disk S extends at an inclination with respect to its direction of extent, is further transmitted with a beam shift or displacement SV. The beam shift or displacement SV is measured in a direction perpendicular to the plane of the glass disk S.

The magnitude of the beam shift or displacement SV is dependent upon the thickness D of the glass disk S and the refractive index n of the material of the glass disk S. With the aid of the correlations depicted in FIG. 3 it is possible to compute the beam shift or displacement SV.

Reference character α represents the incidence angle of the light beam LST at the glass disk S, measured with respect to the normal N of the glass disk S. Reference character γ designates the angle of refraction of the material of the glass disk S, and reference numeral D designates the thickness of the glass disk S.

It will be readily recognized that the angle AFB=α, and the angle CFB=γ, so that the path or distance AB=D.tgα and the path or distance CB=D.tgγ. Therefore, the distance $AC = AB - CB = (D tg\alpha - tg\gamma)$ and, because the angle AEC=α, the distance $$AE = \frac{AC}{tg\ \alpha}$$

and the distance AE, in other words the beam shift or displacement $$SV = D\left(1 - \frac{tg\ \gamma}{tg\ \alpha}\right).$$

Since the ratio $$\frac{tg\ \gamma}{tg\ \alpha}$$

for small angle of incidence α is, in the first approximation, to be set equal to the ratio $$\frac{\sin\ \gamma}{\sin\ \alpha} = \frac{1}{n}.$$

the beam shift SV for small incidence angle α, in the first approximation, is independent of the angle of incidence α.

With larger angles of incidence α the ratio $$\frac{tg\ \gamma}{tg\ \alpha}$$

decreases, so that the beam shift or displacement SV increases.

The maximum value of the beam shift SV corresponds to the thickness D of the glass disk S, and it is obtained for the angle of incidence α=90°.

Figure 4:
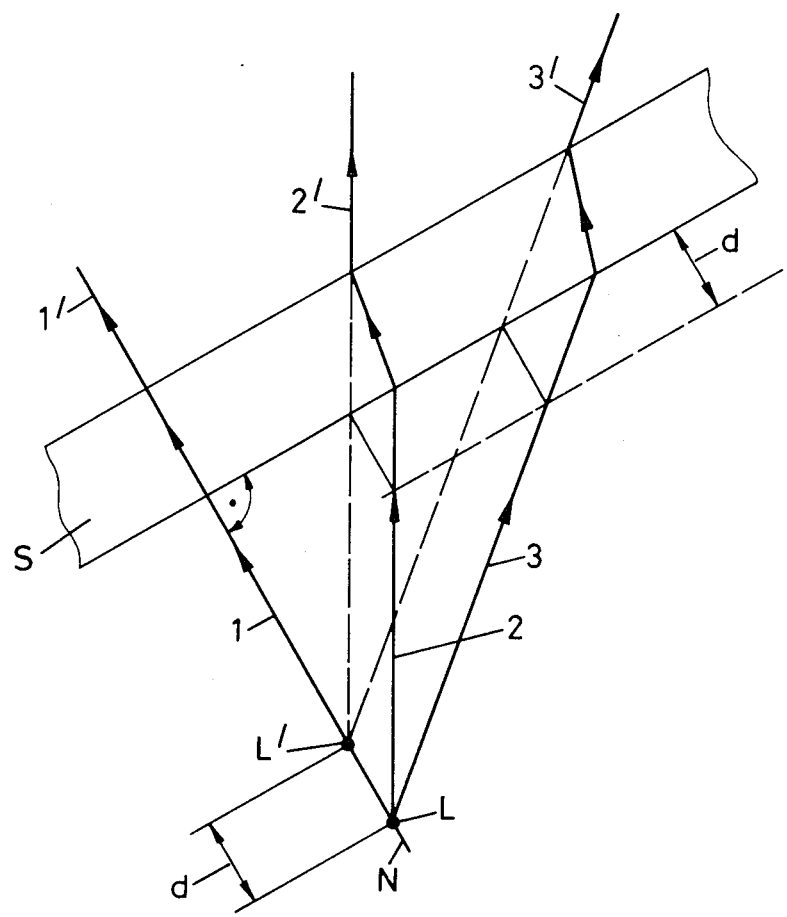
FIG. 4 is a schematic illustration of an apparatus for forming shifted bundles of light beams or rays.

FIG. 4 is a schematic illustration of an apparatus for forming shifted or displaced radiation beams which extend in different solid angle sectors.

A light source L is operatively associated with the glass disk S. Because of the inclined position of the glass disk S there are displaced or shifted in a different manner the light beams 1, 2 and 3 which originate from the common light source L, in such a way that the light beam 1, which impinges perpendicularly at the glass disk S, departs from the glass disk S as a non-shifted light beam 1', the light beam 2 departs as a shifted light beam 2', and the light beam 3 as a shifted light beam 3'. If, for the angle of incidence of the light beams 1, 2 and 3 at the glass disk 3, the ratio $$\frac{tg\ \gamma}{tg\ \alpha}$$

were constant, then the shifted light beams 2' and 3' would appear to be shifted through the same distance d in the direction of the normal N at the glass disk S. This hypothetical case has been assumed in the illustration of FIG. 4. All of the light beams emanating from the glass disk S therefore appear to an observer located at the other side of the glass disk S to originate from the point L' located to this side of the glass disk S. The light source L, assumed to be point-like or punctiform, in this case, is virtually imaged at the point L'. In reality, however, the beam shift, expressed by the displacement d, increases with increasing angles of incidence. The light source L no longer will be virtually imaged exactly in a punctiform or point-like manner at the location L'. In the case of a glass disk S having a limited surface and/or a light source having a limited spatial angle of irradiation also the virtual imaging L' of the light source L has limited dimensions.

Figure 5A:
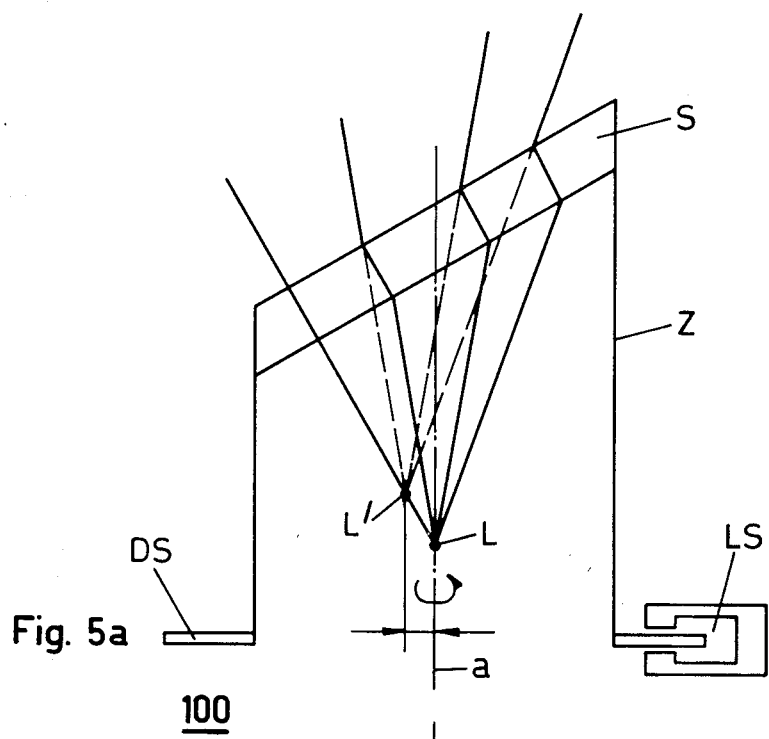
FIGS. 5a and 5b portray in schematic illustration, in elevation and plan views, respectively, a deflection device.
Figure 5B:
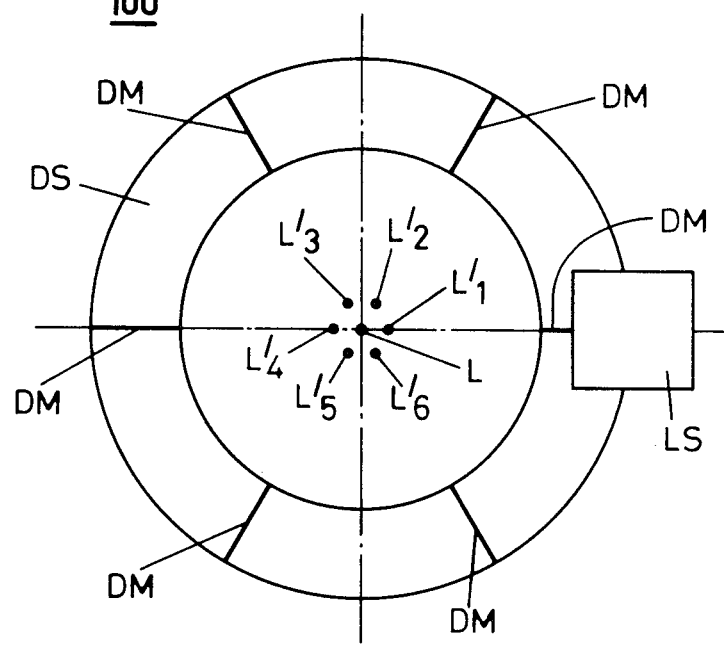

FIG. 5 constitutes a schematic illustration of a beam deflection device or unit 100 operating according to the principles explained previously in conjunction with FIGS. 1 to 4 and containing an inclined glass disk S which is rotatable about an axis a. This glass disk S is mounted in an inclined position in a cylinder or housing Z which, together with the glass disk S, is rotatably arranged about the axis of rotation a. The light source L, for instance a laser diode, is located upon the axis a. The laser diode L operates in a pulsed mode, so that with the cylinder or housing Z rotating, for each delivered pulse measuring beams are transmitted in different solid angle sectors RS (see FIGS. 1a, 1b and 1c). For an observer located to the other side of the glass disk S, during rotation of the cylinder Z, and thus, the glass disk S about the rotational axis a, the virtual images $L'_1$, $L'_2$, $L'_3$, $L'_4$, $L'_5$ and $L'_6$ of the light source L appear to be distributed along a small circle about the light source L, as best seen by referring to FIG. 5b. Conditions corresponding to those depicted in FIGS. 5a and 5b then prevail if during one revolution of the cylinder or housing Z there are transmitted by the laser diode six pulses. Here, there is presupposed that the pulse duration of the pulses is appreciably smaller than the duration needed for one revolution of the cylinder or housing Z. There is then obtained the same effect as if the glass disk S could only assume six discrete positions.

Rigidly connected with the cylinder or housing Z is also a ring-shaped detection disk DS and such rotates in conjunction with the glass disk S. Applied to the detection disk DS are radial detection markers or indicia DM which are arranged at a uniform angular distribution or spacing. There are preferably applied the same number of detection markers DM as there should be formed solid angle or spatial sectors.

By means of a conventional light barrier LS there is detected in known manner the passage of each detection marker or indicia DM through the light beam of the light barrier LS. The output signals of the light barrier LS are inputted to a clock generator for the pulsed operational mode of the laser diode which, as will be recalled, is constituted by the light source L.

It is to be observed that FIGS. 4 and 5a, 5b are not drawn to scale, rather only serve to explain the principles of the invention. An arrangement which complies with practical requirements and serving for the formation of solid angle sectors for the measuring beams, has been depicted in FIG. 6 as concerns the dimensions and angles which are to be advantageously selected. With an arrangement of the type shown in FIG. 6, the glass disk S is inclined at an angle β=78.7° with respect to the direction of the rotational axis a. The glass disk S has a thickness D=4.49 mm, and the refractive index of the used glass of the disk S amounts to n=1.5.

FIG. 6 again illustrates, for instance, three measuring beams 1, 2 and 3, wherein the measuring beam 1 is perpendicularly incident upon the plane of the glass disk S, and therefore, does not experience any beam shift or displacement SV. The measuring beam 1 therefore departs in the same direction, without being refracted, from the glass disk S as it has entered such glass disk. In contrast thereto the measuring beam 2, which departs from the light source L in the direction of the axis a, leaves the glass disk S with a lateral shift or displacement, however parallel to the rotational axis a, in the form of the measuring beam 2'. The measuring beam 3 departs from the glass disk S likewise with a beam or shift or displacement corresponding to the illustrated measuring beam 3'.

Figure 6:
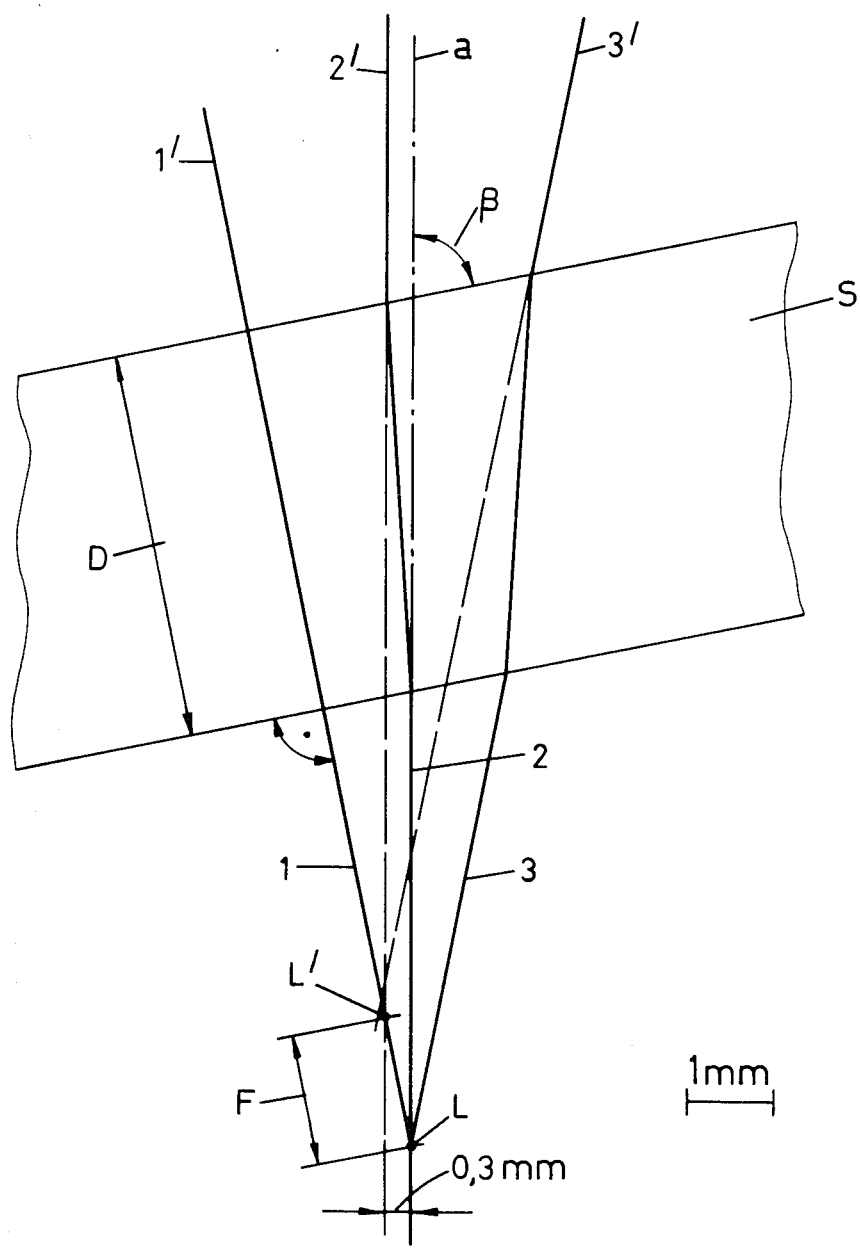
FIG. 6 illustrates a special arrangement of measuring beams.

All three of the measuring light beams 1', 2' and 3' departing from the glass disk S appear to an observer located at the other side of the glass disk S as emanating from the virtual image L, of the light source L. FIG. 6 has been drafted to scale, and it will be recognized that the virtual image L' of the light source L, in accordance with this embodiment, is located slightly adjacent the axis a, that is to say, for instance 0.3 mm adjacent the axis a, and such is shifted in relation to the light source L in the direction of the glass disk S by the amount F=1.53 mm.

The beam of light rays according to FIG. 6 is construed strictly in accordance with Snell's law, and therefore the beams 1', 2' and 3', if they are prolonged rearwardly, do not intersect exactly at a point. However, the deviations which arise can be neglected as a practical matter.

Figure 7:
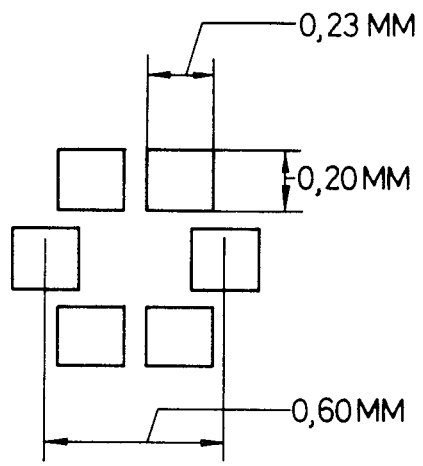
FIG. 7 illustrates to scale virtual images.

If there is used as the light source L, for instance a pulse laser diode of the type LD 163, commercially available from the firm Laser Diode Laboratory Inc., located at 1130 Sommerset Street, New Brunswick, N.Y. 08901, in an arrangement of the type depicted in FIG. 6, then for the six virtual images $L'_1$, $L'_2$, $L'_3$, $L'_4$, $L'_5$, $L'_6$, as shown in FIG. 5, during one revolution of the glass disk S, there results an image drawn to scale according to FIG. 7. Thus, with a single laser diode there is obtained the same effect as if there were employed six laser diodes in the indicated arrangement of FIG. 7. This constitutes an appreciable constructural simplification, which, additionally, results in a considerably reduced technical expenditure.

The rotatable glass disk S constitutes a component of the beam deflection device or unit 100, depicted in FIG. 5, for the optical pulses emanating from the light source L. A transmitter optical system or transmitter optics has assigned thereto the task of imaging at a certain distance, for instance at 50 to 200 meters, the light source L, while taking into account the position of the glass disk S, at the object to be measured, for instance a vehicle or other intended target. This can be accomplished by means of a simple conventional projection optical system. The focal length of the transmitter optic or transmitter optical system should be selected to be so large that, also with the greatest contemplated distance to the object to be measured, the images produced thereat by the transmitter optical system of all virtual light sources $L'_1$, $L'_2$, $L'_3$, $L'_4$, $L'_5$, $L'_6$, in other words the entire group of such images, is smaller than the object to be measured from the viewpoint of the silhouette offered to the measuring apparatus.

With dimensions of 0.228×0.202 mm of the illuminated surface of the laser diode of the aforementioned commercial type, there is sufficient an optical system having a focal length of 100 mm for producing a focal spot or point at the target vehicle to be measured having a diameter of less than 0.5 meters with a spacing of 200 meters between the measuring apparatus and the target vehicle.

Figure 8:
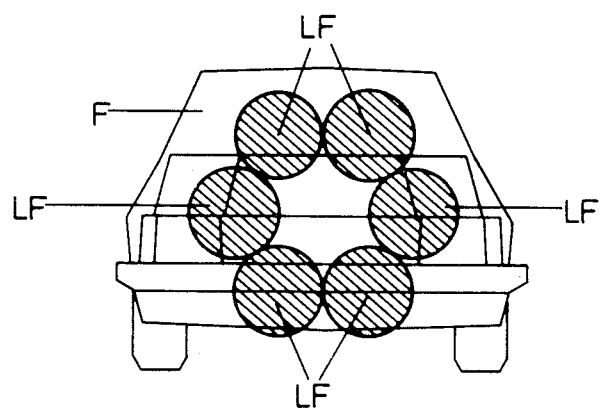
FIG. 8 illustrates light spots at an object to be measured.

The light spot LF projected by the transmitter or transmitting optical system at a target vehicle F to be measured at a distance of 200 meters would hit the vehicle, for instance, approximately as illustrated in FIG. 8 by the shaded circular surfaces. The shape of the light spot LF has been shown essentially circular for the sake of simplicity in the illustration and the discussion. However, the aforementioned laser diode, in reality, has a rectangular illuminated surface. The beam deflection device 100, however, images the illuminated surfaces only somewhat distorted. The transmitter optical system also will only produce a sharp image at a quite predetermined distance. All of these deviations from the ideal case lead to the fact that the actual shape of the light spot LF is approximately circular.

With the just-described equipment it is also possible to direct, for instance, at six neighboring solid angle sectors, optical pulses in the form of measuring beams towards the vehicle F which is to be measured and at that location to produce light spots LF. In accordance with the number of selected solid angle sectors there thus are formed a group of an equal number of light spots at the measured or target vehicle. There is preferably used invisible, for instance infrared light. Practical exemplary embodiments of the transmitter or transmitting optical system will be described in greater detail hereinafter in conjunction with FIG. 10.

At the target or object to be measured, for instance the vehicle F, the impinging measuring beams are at least partially reflected, a portion of the reflected energy is also reflected back to the velocity measuring apparatus and, at that location, is received by the receiver optical system or receiver optics.

The receiver optical system is assigned the task of delivering as large as possible part of the received reflected radiation in a focused condition to a light-sensitive receiver diode.

The focal length of the receiver optical system is preferably chosen to be so large that the light spots LF produced at the object to be measured, can be imaged in their entirety, in other words conjointly for all solid angle sectors, at the light-sensitive surface of the receiver or receiving diode.

There can be beneficially used, for instance, as the receiver diode an avalanche or breakdown diode of the commercially known type C 30902 E, which can be obtained from RCA Corporation, located at Saint Anne de Bellevue, Quebec, Canada, H9X3L3. The light-sensitive surface of such receiver diode has a diameter of 0.5 mm.

When using a receiver optical system possessing the same focal length as the focal length of the transmitter optical system, the light spot pattern of the transmitter apparatus and which is imaged at the receiver diode, possesses a diameter which is three times as large as the illuminating surface of the transmitter or transmitting diode. This is so because of the assumed arrangement of six solid angle sectors. The diameter of such imaging at the receiver-end of the system, in the assumed case, thus amounts to three times 0.228 or 0.684 mm.

To reduce this diameter for the purpose of accommodation of the imaged illuminated surface pattern to the diameter of 0.5 mm of the receiver diode, it is therefore necessary to select the focal length of the receiver optical system so as to be preferably 0.684/0.5=approximately 1.4 times smaller than the focal length of the transmitter optical system. For instance, in the case of a transmitter optical system having a focal length of 140 mm the receiver optical system should possess a focal length of about 100 mm.

The arrangement of the receiver optical system relative to the transmitter optical system should be preferably selected such that all light spots of the total light spot pattern for all measuring distances from the receiver optical system should arrive as completely as possible for imaging at the light-sensitive surface of the receiver diode. With a lateral arrangement of axial parallel optical systems this requirement only can be fulfilled in a limited distance range if the focal length of the receiver optical system should not be made shorter than absolutely necessary.

In order to ensure for the distance-independent imaging of the illuminated surfaces upon the receiver diode it is therefore necessary for the axes of the receiver optical system and the transmitter optical system to coincide. This can be realized, in a practical arrangement, by means of a concentric arrangement of both optical systems.

Figure 9B:
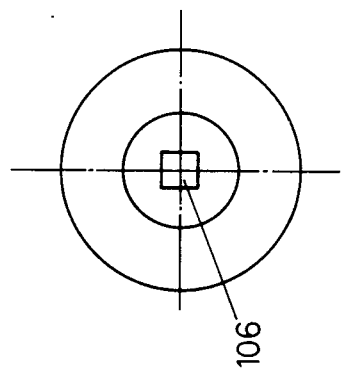
FIGS. 9a and 9b schematically illustrate in respective lengthwise and end views an advantageous arrangement of the transmitter optical system and receiver optical system.
Figure 9A:
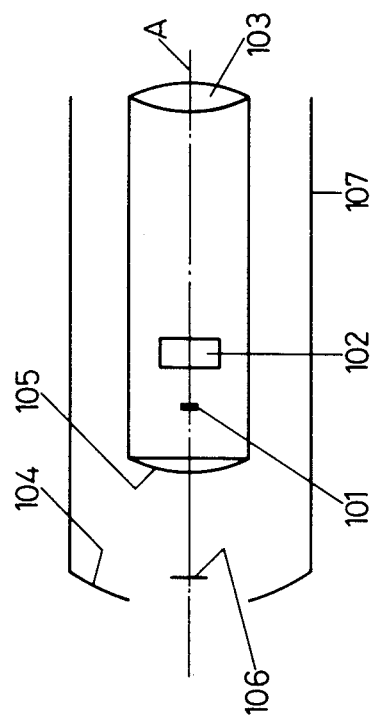

FIGS. 9a and 9b schematically illustrate a particularly advantageous arrangement of the transmitter-receiver optical systems. With such arrangement reference character A designates the primary or main axis of both optical systems. As the light source L there is provided a laser diode 101 with which there is operatively associated the beam deflection device or unit 102 and the transmitter optical system 103.

In accordance with the embodiment of FIGS. 9a and 9b, the receiver optical system is constructed as a so-called Cassegrain arrangement containing a parabolic mirror or reflector 104 which is located opposite a hyperbolic mirror or reflector 105. The radiation reflected by the target object to be measured and incident from the right upon the cylinder 107 is focused by the parabolic mirror 104, by means of the hyperbolic mirror 105, upon the receiver diode 106. The receiver diode 106 forms from the received radiation an electrical signal which is then further processed.

Cassegrain optical systems are well known, for instance as disclosed in the text book entitled "Optik für Konstrukture", authored by Dr. Helmut Naumann, third edition, Wilhelm Knapp-Verlag, Düsseldorf N, West Germany, page 150, FIG. 206.

In light of the comprehensive explanations already made concerning the basic problems of the invention, at this point there will now be given a detailed description of an exemplary embodiment.

Figure 10:
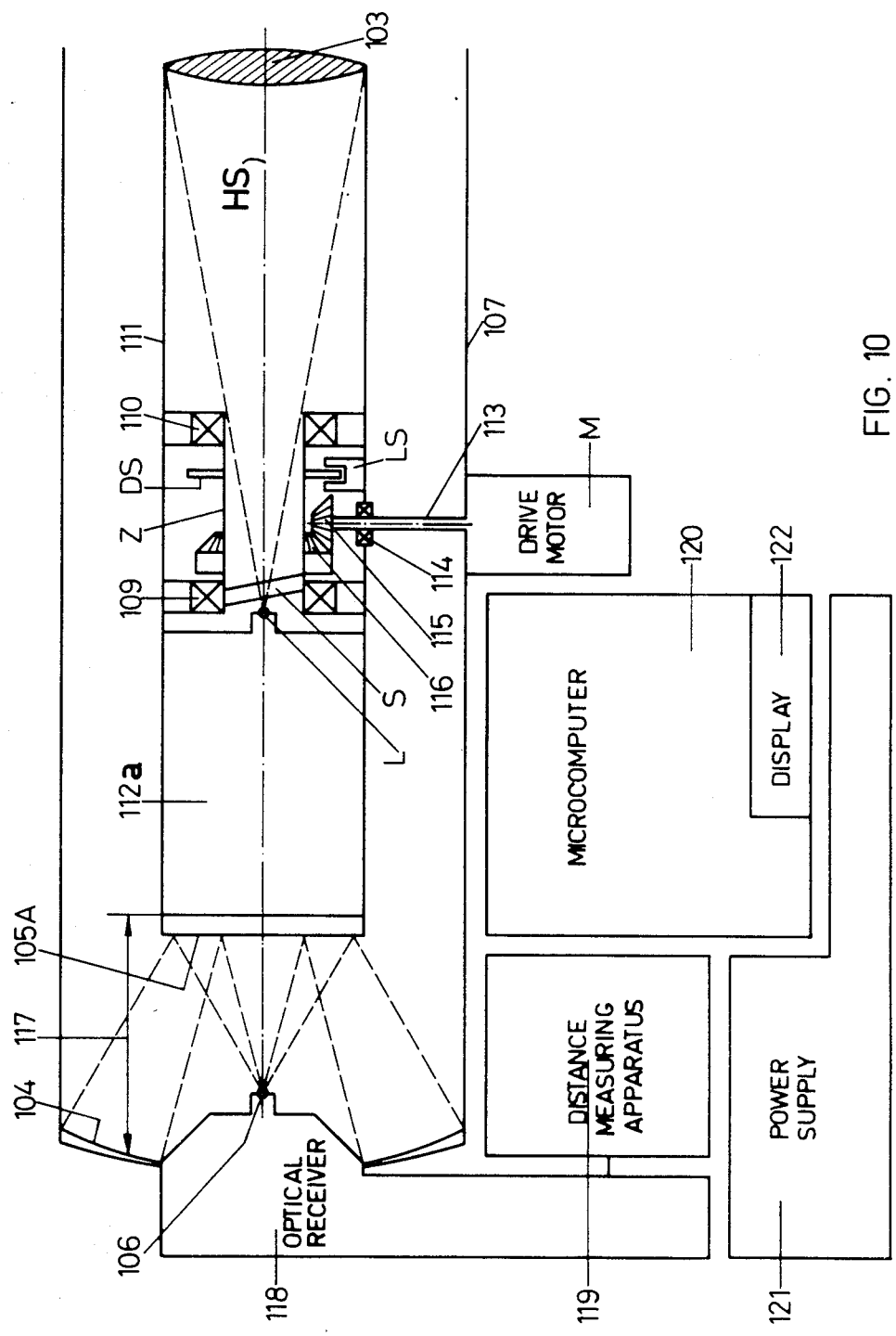
FIG. 10 schematically illustrates the construction of an apparatus according to the invention.

FIG. 10 schematically illustrates, partially in sectional view and partially in the form of a block circuit diagram, the construction of an exemplary embodiment of apparatus according to the invention. At the transmitter-end of the system there is located the light source L, the inclined, rotatably mounted glass disk S, the detection disk DS as well as the light barrier LS, all of which components are mounted in the cylinder or housing Z. This cylinder Z is rotatably mounted in two bearings 109 and 110 within a tube or barrel 111.

At the left-hand portion of the tube or barrel 111 there is arranged the transmitter power supply 112a which contains all of the electronic components needed for the pulsed operational mode of the light source L. At the left-hand end of the tube or barrel 111 there is also arranged a mirror 105A which already constitutes part of the receiver system.

By means of a drive motor M arranged externally of the tube or barrel 111 there is driven through the action of a shaft 113, mounted in a bearing 114, a bevel gear 115. This bevel gear 115 meshes with a further ring-shaped further bevel gear 116 which is rigidly attached to the cylinder Z. With the drive motor M turned-on the cylinder or housing Z together with the glass disk S secured therein and the detection disk DS are placed into rotation within the bearings 109 and 110, and the light bundle or beam emanating from the light source L is deflected into the contemplated solid angle sectors RS. Since, as previously explained, the light source L is operated only in a pulsed mode which is coordinated with the rotation of the glass disk S, the discrete light pulses are deflected in each case in a coordinated fashion into the related solid angle sectors RS.

At the right-end of the tube or barrel 111 there is secured the transmitter optical system 103, by means of which there are imaged at the object or target to be measured the virtual light spots $L'_1$ to $L'_6$, as also recognized by referring to FIGS. 5, 6 and 7.

With the exemplary embodiment depicted in FIG. 10, the receiver or receiving optical system 117 consists of the ring-shaped parabolic mirror 104 and the oppositely located planar or flat mirror 105A. Instead of using a planar mirror or reflector 105A there also could be provided a hyperbolic mirror or reflector 105 of the type depicted in FIG. 9.

At the focal point of the mirror or reflector system 104 and 105A there is arranged the receiver diode 106 which is electrically connected to the input side of an optical receiver 118.

Following the optical receiver 118 is a distance measuring apparatus 119 which processes the output signals of the optical receiver 118.

There is provided a microcomputer 120 for controlling the measuring cycle or course and for accomplishing the different functions which will be discussed in greater detail hereinafter. A power supply unit 121 serves to supply power to the different components. A display device 122 serves for the display of the velocity of the measured object or target which has been computed with the aid of the microcomputer 120.

The receiver or receiver circuit 118 is constructed in known manner, for instance in accordance with the teachings of the aforementioned German Patent Publication No. 2,723,835 and the corresponding U.S. Pat. No. 4,181,431. Also from the state-of-the-art there are known further data for optical receivers for performing distance measurements.

The distance measuring circuit 119, which, for instance can be constructed in accordance with the teachings of the German Patent Publication No. 2,723,835, has inputted thereto pairs of pulses for evaluation. The first pulse of such pair of pulses marks the point in time of transmission of a pulse and the second pulse is formed during reception of a pulse reflected at a measured object or target and arriving at the measuring device. An analog voltage corresponding to the transit time of the transmitted pulse to the object to be measured and back again to the velocity measuring device is inputted from the output of the distance measuring device 119 to a conventional analog-to-digital converter which has not been particularly shown in FIG. 10.

The microcomputer 120 fulfills the following tasks:

1. Control of the measuring cycle or course as will be described more fully hereinafter.

2. Reading-in of the distance value to the object or target to be measured and transmitted by the aforementioned analog-to-digital converter in digital code.

3. Checking and evaluation of the measured distance values.

4. Derivation and checking of a reliable velocity value.

5. Delivering the computed velocity measuring value to the display decoder and display driver.

For this purpose the microcomputer 120 is connected with:

(a) A start-stop input of a hereinafter to be described transmitter trigger circuit and drive regulation circuit;

(b) the output of the transmitter trigger circuit;

(c) the outputs of the aforementioned analog-to-digital converter;

(d) an input of the analog-to-digital converter for transmitting the conversion commands;

(e) the inputs of the display decoder and display driver; and (f) a start-stop button or key.

Figure 11:
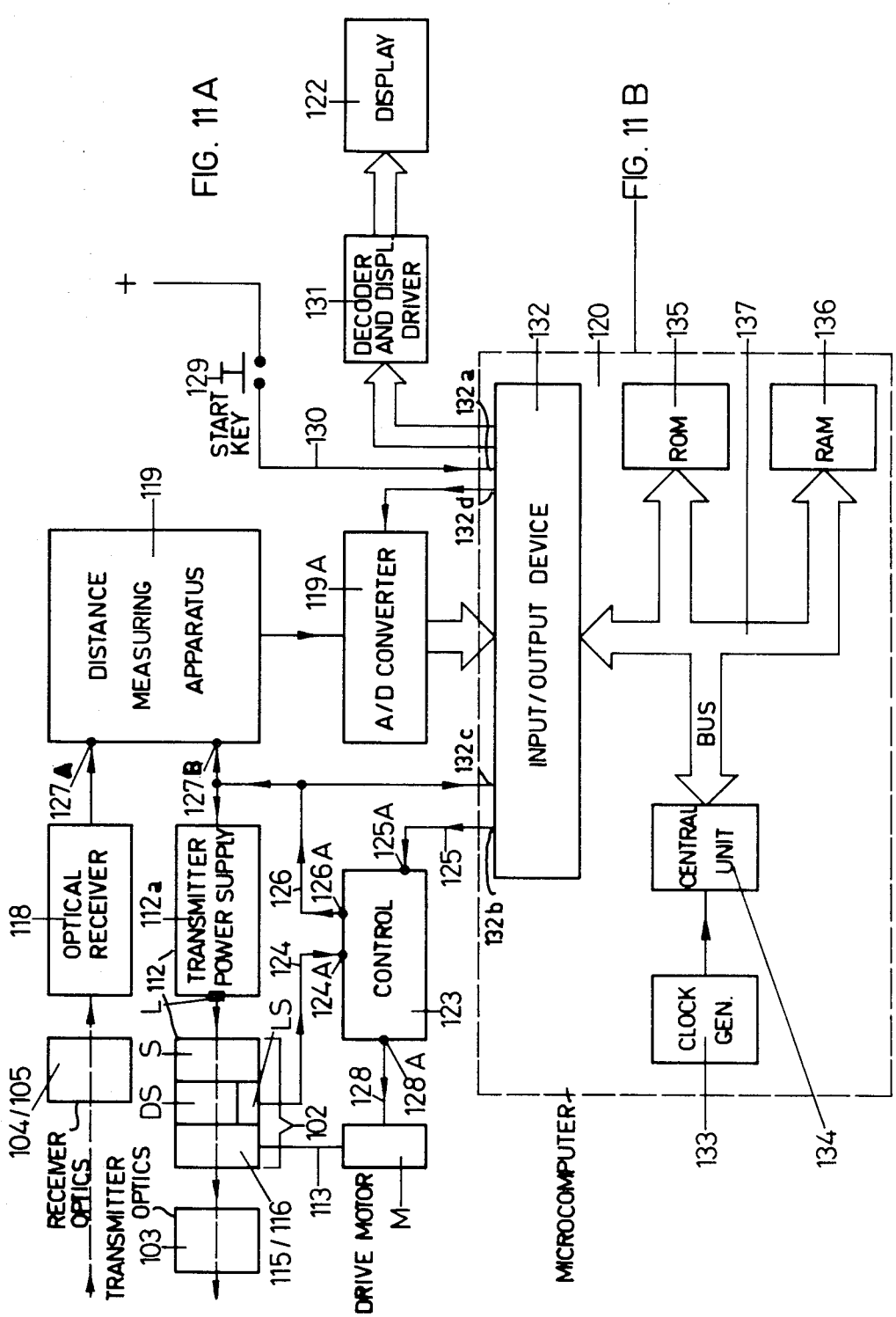
FIGS. 11A and 11B illustrate a block and functional schematic diagram of a velocity measuring apparatus according to the invention.

FIGS. 11A and 11B illustrate a block and functional circuit diagram of the velocity measuring apparatus. To the extent that the parts depicted therein have already been heretofore described, they have been conveniently designated with the same reference characters previously used.

Turning attention now specifically to FIG. 11A, there will be recognized the transmitter 112 containing the light source L, the glass disk S for the beam deflection and equipped with the detection disk DS which carries the detection markers DM, for the control of the transmitted pulse sequence by means of the light barrier LS. The related drive is accomplished by means of the drive motor M, the shaft 113 and the bevel gears 115 and 116. The pulses delivered by the light source L are transmitted in each case into defined solid angle sectors RS by virtue of the defined position of the deflection disk S, and they are imaged by the transmitter optical system or transmitter optics 103 at the object or target which is to be measured.

Reflected pulses arrive by means of the receiver optical system or receiver optics 104, 105 at the optical receiver 118, the output pulses of which are inputted to a stop input 127A of the distance measuring apparatus or circuit 119. By means of the analog-to-digital converter 119A the distance measuring values of the distance measuring circuit 119 are infed to the microcomputer 120 for further processing.

So that the transmitter pulses are transmitted to exactly defined solid angle sectors RS, the drive motor M for the deflection device 102 is controlled by a control device 123.

On the one hand, there are inputted by means of a line or conductor 124 to the control device or control 123 from the light barrier LS of the beam deflection unit or device 102 the control pulses produced upon passage of the detection markers or indicia DM and, on the other hand, the control device 123 receives commands, corresponding to the measuring cycle or course, by means of a line or conductor 125 from the microcomputer 120. The transmitter trigger pulses of the control device 123 arrive by means of a line or conductor 126 both at the transmitter 112 and also at a start input 127B of the distance measuring apparatus or circuit 119 and also back at the microcomputer 120. Additionally, there is delivered from the control device 123, by means of a line or conductor 128, to the drive motor M of the deflection device 102 an exactly controlled or dosed drive current in such a manner that the detection disk DS not only assumes the correct rotational speed, but also the correct phase position and retains such throughout the measurement operation.

To initiate a measurement operation, after the velocity measuring apparatus has been optically aligned with a predetermined object or target which is to be measured, for instance by means of a known sighting device or optical finder, there is provided a start button or key 129 or equivalent structure. If the start button or key 129 is activated, then by means of a line or conductor 130 there is inputted to the microcomputer 120 a start signal for triggering a measuring operation.

The microcomputer 120, in turn, after successful completion of a measurement operation, controls the display device 122 by means of a decoder and display driver 131.

FIG. 11B schematically illustrates the construction of the microcomputer 120 with its input-output unit or device 132, a clock generator 133, a central processor unit or device 134, a read-only memory (ROM) 135, a random access memory (RAM) 136 and a bus bar or bus 137.

The control device 123, as will be apparent from the illustration of FIGS. 11A and 11B, possesses two inputs 124A and 125A and two outputs 126A and 128A. Its first or one input 125A is connected by means of the line 125 with the input-output device 132 of the microcomputer 120. There is infed thereto a signal which, at the start of a measurement operation, shifts from a logic state "0" to a logic state "1", however during the measurement operation remains at the logic state "1" and upon completion of the measurement operation returns back to the logic state "0".

The second or other input 124A is connected with the output at the light barrier LS of the deflection device or unit 102 and receives a pulse each time when a detection marker or indicia DM of the detection disk DS passes through the light barrier LS.

The drive regulation circuit contained in the control device 123 is assigned the task of controlling throughout the duration of a measurement operation or cycle, by means of its output 128A and the line 128, the drive motor M in such a manner that the deflection disk S, upon triggering of the transmitter, is always located in an exactly defined or predetermined position. Directly after the start of a measurement operation such will not yet be the case because of the inertia of the deflection device 102. Only after acceleration of the deflection device 102 to the reference or set rotational speed and after retaining an exact phase position will there have been reached the desired state.

Therefore, the transmitter trigger or release circuit of the control device 123 is assigned the task of inputting a series of trigger or release pulses at exactly predetermined and extremely constant time intervals to the transmitter 112 by means of its further output 126A and the line 126 only after reaching this desired condition or state of the deflection disk S. These exact time intervals of the transmitter pulses form the basis for the velocity determination of the measured object. The deflection disk S therefore, upon triggering the transmitter 112, must be located in an exactly defined position, because the object or target to be measured must be measured in each case at one predetermined location of a number of possible locations by the momentary measuring beams.

Figure 12:
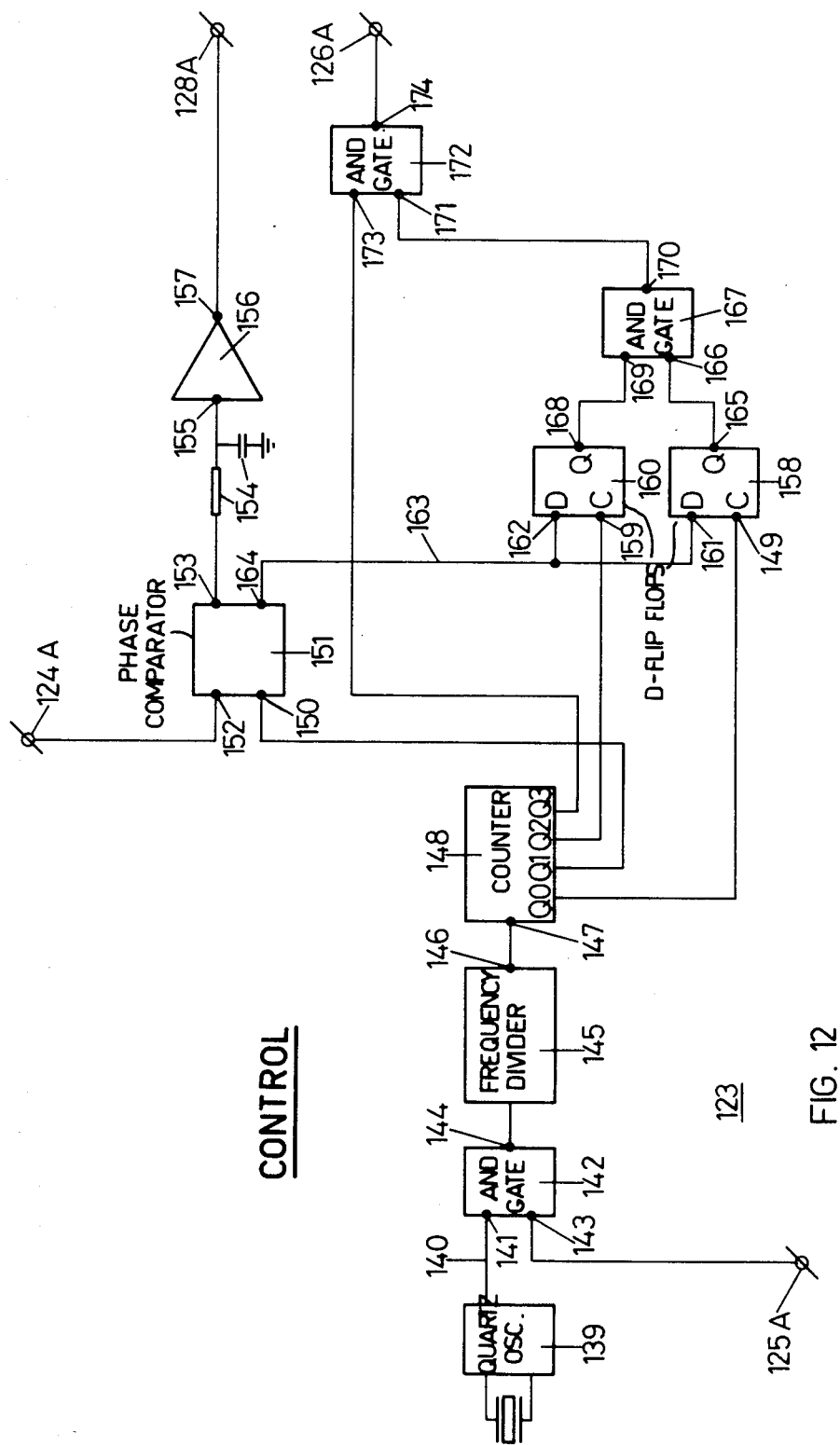
FIG. 12 is a block circuit diagram of a transmitter triggering and drive regulation circuit.

FIG. 12 illustrates a block circuit diagram of an exemplary embodiment of a transmitter trigger and drive regulation circuit embodying the control or control device 123. As the basis for the generation of transmitter pulses having an exact repetition frequency there is beneficially provided a quartz oscillator 139 of known construction having a frequency of, for instance, 1.53600 MHz. The output signal is inputted by means of a line 140 to a first input 141 of an AND-gate 142, the second input 143 of which is connected by means of the input 125A and the line 125 with the input-output device 132, as also best seen by referring to FIGS. 11A and 11B. Only during the course of a measurement which is initiated upon actuation of the start-stop button or key 129, does there therefore appear the quartz-accurate squarewave signal at the output 144 of the AND-gate 142.

It has been found to be advantageous to provide as the repetition frequency for the transmitter pulses a frequency of, for instance, 100 Hz per channel, and thus, in the case of a six-channel construction 600 Hz. Since quartz crystals for such low frequencies are extremely difficult to fabricate, the originally selected quartz frequency of, for instance, 1.53600 MHz is stepped down in known manner by means of a frequency divider 145 in a ratio of $2^8 = 256$. This stepped down frequency of 6000 Hz appears at the output 146 of the frequency divider 145.

Figure 13:
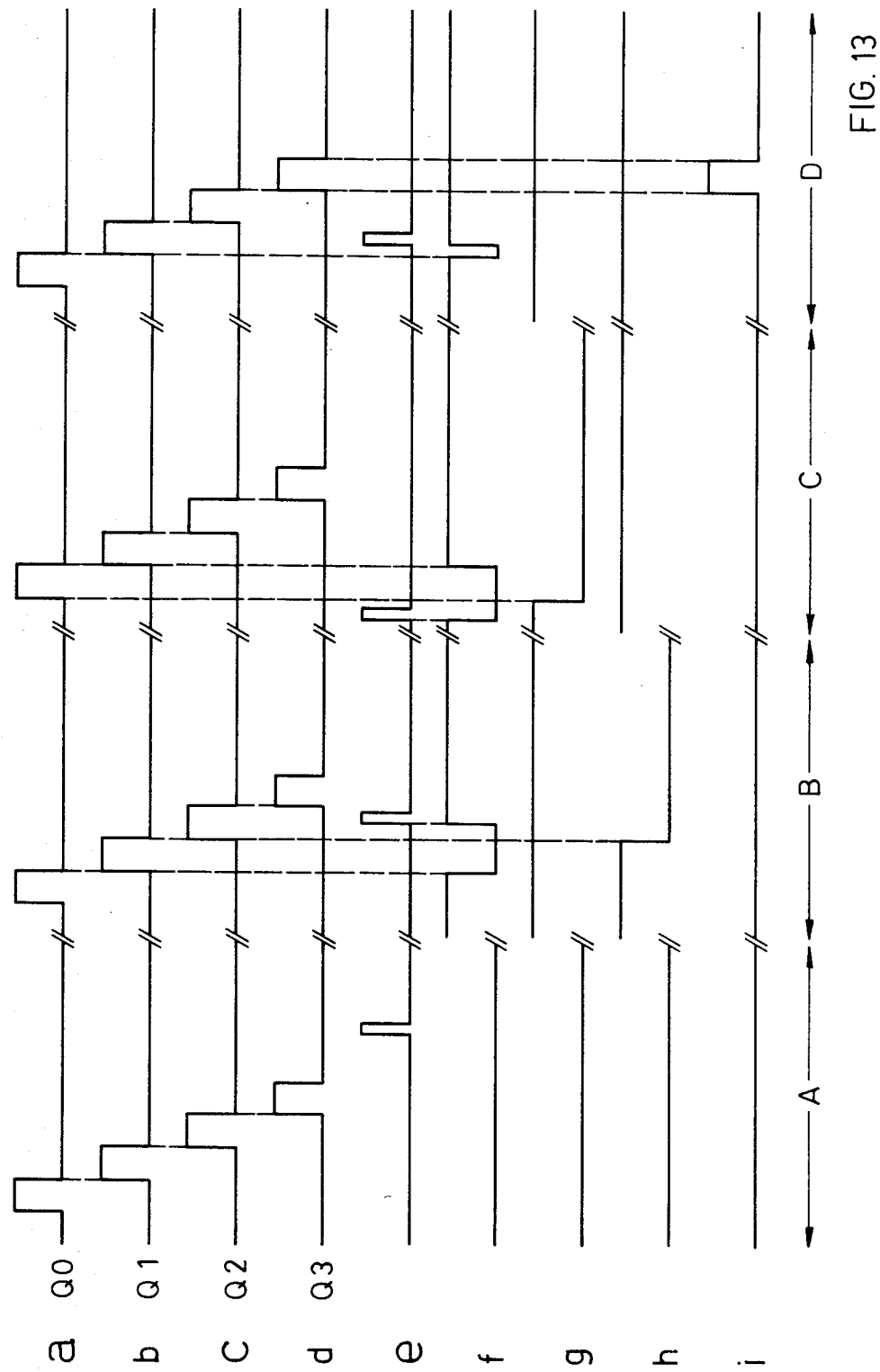
FIG. 13 illustrates pulse diagrams for four time intervals.

In the assumed example working with a repetition frequency of the transmitter pulses of 600 Hz the frequency divider 145 therefore is constructed such that it delivers at its output 146 a squarewave signal having a frequency of 6000 Hz. This frequency is inputted to the input 147 of a Johnson counter 148. Such type of Johnson counter 148 is well known in the electronics art, as taught for instance in CMOS Databook Fairchild, 1977 Edition, pages 7 to 33, component 4017B. In the field of application under discussion there are only used the four outputs Q0, Q1, Q2, Q3, in order to generate timewise shifted pulse sequences having a pulse sampling ratio of 1:10, as illustrated in FIG. 13. The pulse sequence or train appearing at the output Q0 is inputted to the clock input 149 of a first D-flip-flop 158. The pulse sequence or train of the output Q1 is inputted to a first input 150 of a phase comparator 151. A further input 152 of this phase comparator 151 has inputted thereto by means of the input 124A (see also FIG. 11A) the output signal of the light barrier LS. As the phase comparator 151 there can be used, for instance, the commercially available component 4046B disclosed at pages 7-93 to 7-97 of the previously mentioned CMOS Databook Fairchild. The regulation output signal of the phase comparator 151 is delivered from the regulation output 153 by means of a low-pass filter 154 to the input 155 of a power amplifier 156. The output signal of the power amplifier 156 is delivered from its output 157 by means of the output 128A to the drive motor M (see FIG. 11A).

The pulse sequence or train appearing at the output Q2 is inputted to the clock input 159 of a second D-flip-flop 160.

The D-input 161 of the first D-flip-flop 158 and the D-input 162 of the second D-flip-flop 160 have inputted thereto a control signal by means of a line or conductor 163 from the control output 164 of the phase comparator 151.

The Q-output 165 of the first D-flip-flop 158 is connected with a first input 166 of a second AND-gate 167. The Q-output 168 of the second D-flip-flop 160 is connected with a second input 169 of the second AND-gate 167. The output 170 of the second AND-gate 167 is connected with a first input 171 of a third AND-gate 172, whereas a second input 173 of the third AND-gate 172 has inputted thereto the pulse sequence from the output Q3 of the Johnson counter 148.

By virtue of the described signal linking there is formed at the output 174 of the third AND-gate 172 the transmitter trigger or release signal and such is conducted to the output 126A of the transmitter trigger and drive regulation circuit i.e. the control device 123 (cf. also FIG. 11A).

FIG. 13 schematically illustrates pulse diagrams for the four time intervals A, B, C and D along the lines a, b, c and d, as the same appear at the outputs Q0, Q1, Q2 and Q3 of the Johnson counter 148. In contrast thereto, the line e illustrates for the same time intervals a pulse sequence or train which is constituted by the output signal of the light barrier LS.

The line f shows the signal course appearing at the control output 164 of the phase comparator 151, and thus, at the D-inputs of the first D-flip-flop 158 and the second D-flip-flop 160.

The lines g and h depict the signal course at the output 165 and the output 168 of the first D-flip-flop 158 and the second D-flip-flop 160, respectively.

Finally, the line i portrays the occurrence of a transmitter trigger signal which is bound with the pulse sequence at the output Q3 of the Johnson counter 148 at the time interval D when the rotational speed and the phase position of the detection disk DS, and thus, the position of deflection the disk S are correct.

As far as these aforementioned pulse diagrams are concerned there is still to be commented as follows:

By means of the quartz oscillator 139 and the frequency divider 145 provided with the subsequently connected Johnson counter 148 there is formed at its outputs Q0, Q1, Q2, Q3 an exact time grid.

As best seen by referring to FIG. 11A, the beam deflection device 102 is incorporated as to frequency and phase, by means of the detection disk DS with its detection markers DM detected by the light barrier LS, into a regulation system by means of the phase comparator 151, the low-pass filter 154, the power amplifier 156 and the drive motor M.

This regulation system encompasses the phase comparator 151, in which the rotational speed and the phase position of the beam deflection device 102 are brought into a predetermined relationship with regard to the aforementioned time grid.

In FIG. 13 during the time interval A, as depicted in line e, neither the rotational speed of the disk S nor the phase position of the output signal of the light barrier LS are coordinated with the time grid. Consequently, there is not yet delivered any transmitter trigger or release signal by the arrangement of the D-flip-flops 158 and 160 and the AND-gate 172.

At the time interval B the deflection disk S has attained the desired rotational speed, and thus, also the output signal of the light barrier LS, according to the showing of FIG. 13, line e, has reached the set or reference frequency. However, the pulses of the light barrier LS still lag by too much the pulses at the output Q1 of the Johnson counter 148. Therefore, at the time of the ascending flank of the pulse at the output Q2 of the Johnson counter 148 the control output 164 of the phase comparator 151 is still at the logic state "0", and thus, there appears at the input 162 of the D-flip-flop 160 the logic state "0", and consequently, there can not yet appear any transmitter trigger pulses at the output of the AND-gate 172.

At the time interval C the output signal of the light barrier LS still possesses the correct frequency, but however the desired phase has not yet been attained since the light barrier pulses portrayed in line e, during this time interval, still lead by too much the pulses emanating from the output Q1 of the Johnson counter 148. The control output 164, at the time of the ascending flank of the pulse at the output Q0 of the Johnson counter 148, is already at the logic state "0", and therefore this logic value is delivered to the input 161 of the D-flip-flop 158. Consequently, the pulses appearing at the output Q3 of the Johnson counter 148 are still not able to be transmitted to the output 174 of the AND-gate 172.

Only at the time interval D, with correct rotational speed of the disk S and corresponding correct frequency of the pulses from the light barrier LS, is the phase difference between such pulses and the pulses appearing at the output Q1 of the Johnson counter 148 so small that both in the first D-flip-flop 158 and also in the second D-flip-flop 160 can there be simultaneously inputted the logic state "1". Hence, the AND-gate 172 is no longer disabled or blocked and the pulses emanating from the output Q3 of the Johnson counter 148 now appear as transmitter trigger or release signals at the output 126A of the transmitter trigger and drive regulation circuit or control 123 (cf. FIG. 11A).

Due to the strict correlation or interrelationship of the movement of the deflection disk S with the aforementioned time grid this disk S always assumes exactly defined angular positions with respect to the fixed time points for triggering the transmitter pulses. The optical, for instance infrared pulses, triggered by the light source L, for instance a laser diode, by the transmitter pulses, are therefore deflected by the deflection disk S in quite exactly defined solid angle sectors. Since, in the assumed exemplary embodiment, there are produced 600 pulses per second and the deflection disk S rotates with 100 revolutions per second, there are transmitted in six defined solid angle sectors per second in each case 100 pulses. Upon alignment of the apparatus with a predetermined object or target, typically for instance an automobile, there are thus produced at the object to be measured, for instance in accordance with FIG. 1b, six light spots. A portion of the transmitted energy is reflected back to the apparatus, and there can be computed from the transit or travel time of the thus received reflected pulses in known manner the momentary distances to the measured object or target. At this point there will now be described hereinafter in greater detail the course of the measurement operation.

As explained, the equipment is preferably designed approximately, for instance, in the manner of a film camera and is equipped with a preferably optical search or finder system, in order to align as accurately as possible the equipment or its main radiation direction HS (see FIG. 10), as the case may be, at the object or target which is to be measured.

As soon as the main or primary radiation direction HS of the equipment is directed exactly at the front of an approaching or inbound vehicle or the rear of an outbound vehicle, then there is depressed or activated the start button or key 129 (cf. FIG. 11A), and thus, there is triggered a measurement operation or cycle. It is important to maintain throughout the course of the entire measuring operation or cycle the equipment aligned as accurately as possible with the object or target to be measured. The equipment therefore should be able to track a moving object, while avoiding to the extent possible, any momentary positional fluctuations of the equipment. Therefore, it is advantageous to design the equipment so that it can be easily manually manipulated or handled. Also, there can be used a so-called single-leg stand which is known, for instance, from the photographic arts, in order to impart to the equipment a more stable alignment feature.

With the depression of the start button or key 129 there is inputted to an input 132a of the input-output device 132 of the microcomputer 120 (see FIGS. 11A and 11B) a signal possessing the logic state "1". As a result, the microcomputer 120 delivers by means of a start-stop output 132b and via the line or conductor 125 a logic signal "1" to the input 125A of the transmitter trigger-and drive regulation circuit or control 123. Consequently, there is released the delivery of the frequency-accurate signal of the quartz oscillator 139 by means of the AND-gate 142 in the manner already previously described in conjunction with FIG. 12 for the purpose of forming the aforementioned exact time grid.

The drive motor M of the beam deflection device 102 is turned-on and upon reaching the reference or set rotational speed and the exact phase of the detection disk DS, and thus, the deflection disk S itself, there are transmitted the optical measuring beams to the provided solid angle sectors RS. The microcomputer 120, since the initiation of the start signal by means of the start button or key 129, dwells in its waiting loop until it determines at its relevant input 132c the presence of the first transmitter trigger pulse.

A short time span or interval after determination of a transmitter trigger pulse, during which the distance measuring circuit 119 (FIG. 11A) determines a distance measuring value to the object or target to be measured and transmits such further in the form of an analog voltage to the analog-to-digital converter 119A, the microcomputer 120 delivers a conversion command to the analog-to-digital converter 119A. Again, following a short time span after this conversion command, during which the analog-to-digital converter 119A has converted the analog distance value into a digital code, the microcomputer 120 reads-in the digitized distance value.

After the reading-in of the distance value there are accomplished therewith certain operations by the microcomputer 120. After the completion of such operations there are undertaken certain decisions as a function of the obtained results. These operations and decisions will be described in greater detail hereinafter. At this point there is merely mentioned that this sequence of operations and decisions can only occupy a certain time span, namely, until the arrival of the next following transmitter trigger pulse. After completion of the aforementioned predetermined time span or interval for the brief data processing operation the microcomputer 120 again goes into its waiting loop until it determines the presence of a next trigger pulse.

It is in principle possible, especially in the time immediately after attaining the frequency and phase synchronization of the disk S that individual ones or a number of pulses of the pulse series are blocked by the described regulation circuit due to brief deviations of the drive regulation. Such an absence of pulses must be detected by the microcomputer 120, since otherwise the correlation of the read-in distance measuring values to predetermined solid angle sectors RS and their related measuring channels MK becomes questionable or impossible.

The mode of operation of the apparatus, to the extent that the same is controlled by the microcomputer 120, will be explained hereinafter also in conjunction with flow charts.

The momentary time duration of the dwell or residence of the microcomputer 120 in a waiting loop is internally measured by the apparatus, for instance by incrementizing, i.e. by adding-up or, as the case may be, by filling a register. After the arrival of a transmitter trigger pulse there is checked the expired waiting time and there is thus determined whether, and if so, how many pulses possibly were missing.

The read-in distance measuring values, as will be still described hereinafter, are correlated by the microprocessor 120 to the individual measuring channels MK and processed. After fulfilling certain criteria, for instance as concerns reliability, there can be determined and outputted from such distance measuring values and the related expired time spans the relevant velocity measuring values.

During the computation of a velocity measuring value, it is of extreme significance that the distance measuring values possess an exact timewise equidistance. Because the transmitter has inputted thereto from the transmitter trigger-and drive regulation circuit or control 123 (cf. FIGS. 11A and 11B) a transmitter trigger pulse sequence, which possesses known and constant time intervals between the individual pulses, there is applicable this condition of the timewise equidistance.

Although the drive of the deflection device is coupled in a phase-locked fashion with the transmitter trigger pulse sequence, nonetheless small errors in the synchronization lead to the phenomenon that the directions of the measuring beams and the resulting solid angle sectors RS do not completely exactly repeat themselves. The light spot pattern at the measured object or target therefore will slightly spatially rotate because of such errors in the course of the synchronization. As long as such rotations are slight in relation to the actual dimensions of the light spot pattern their effect is also practically without any significance. However, if the rotations become too great, then they are detected by the transmitter trigger-and drive regulation circuit or control 123, and there is temporarily blocked the transmitter trigger pulse sequence until there has again been established a sufficient synchronism.

A measurement which has been initiated after fulfilling or, as the case may be, not fulfilling certain criteria will be interrupted as having been successful or, as the case may be, unsuccessful. The start-stop output 132b of the microcomputer 120 and the line or conductor 125, respectively, is thus brought to the logic state "0". The transmitter trigger pulse sequence is thus interrupted, and the drive motor M of the drive device 102 is no longer supplied with current, so that the apparatus again attains its rest state.

In relation to an exemplary embodiment containing six solid angle sectors $RS_1$, $RS_2$, $RS_3$, $RS_4$, $RS_5$ and $RS_6$, and accordingly six measuring channels $MQ_1$, $MQ_2$, $MQ_3$, $MQ_4$, $MQ_5$ and $MQ_6$, there will now be explained the related programs and flow charts.

Figures 1, 14:
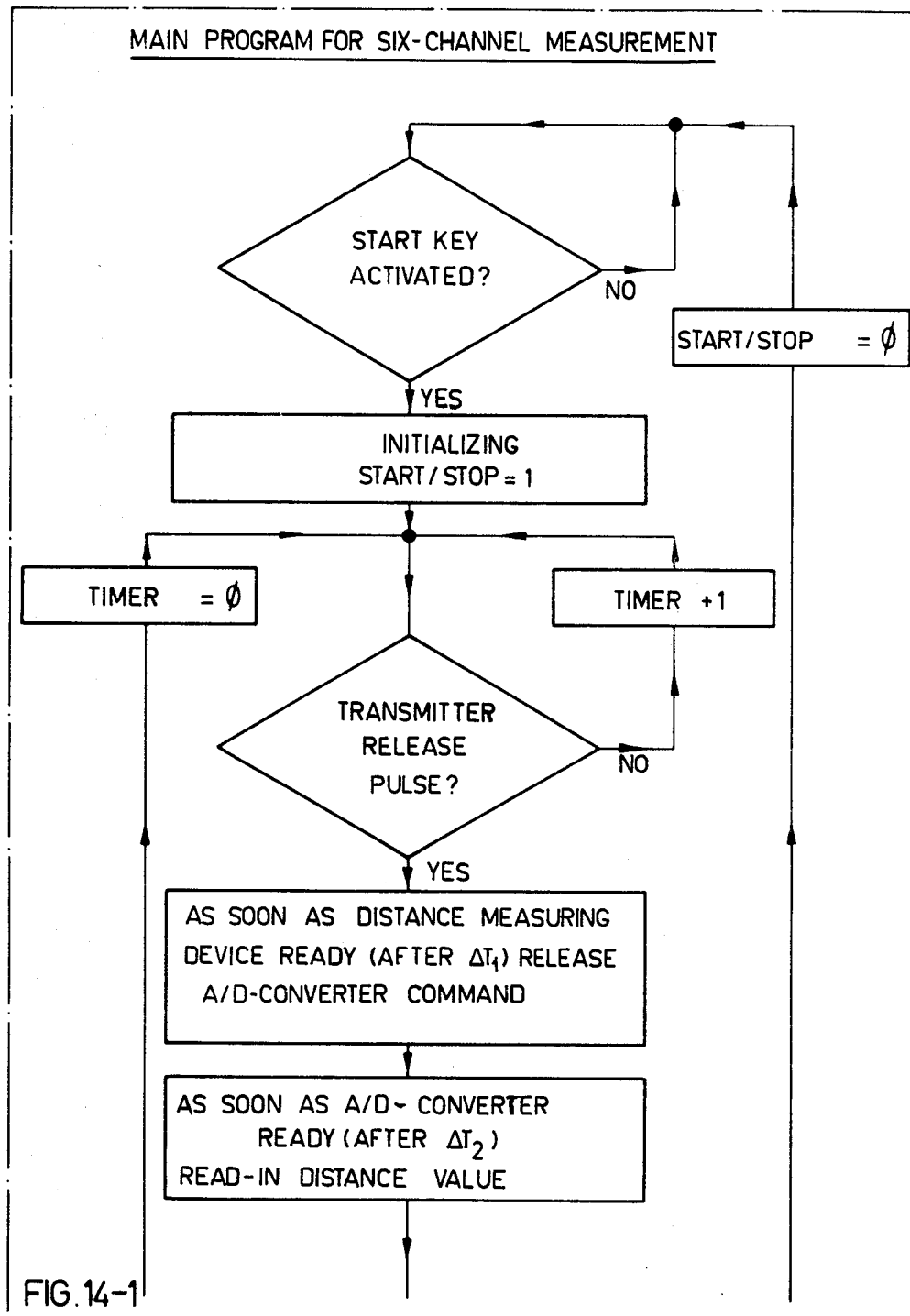
Figures 2, 14:
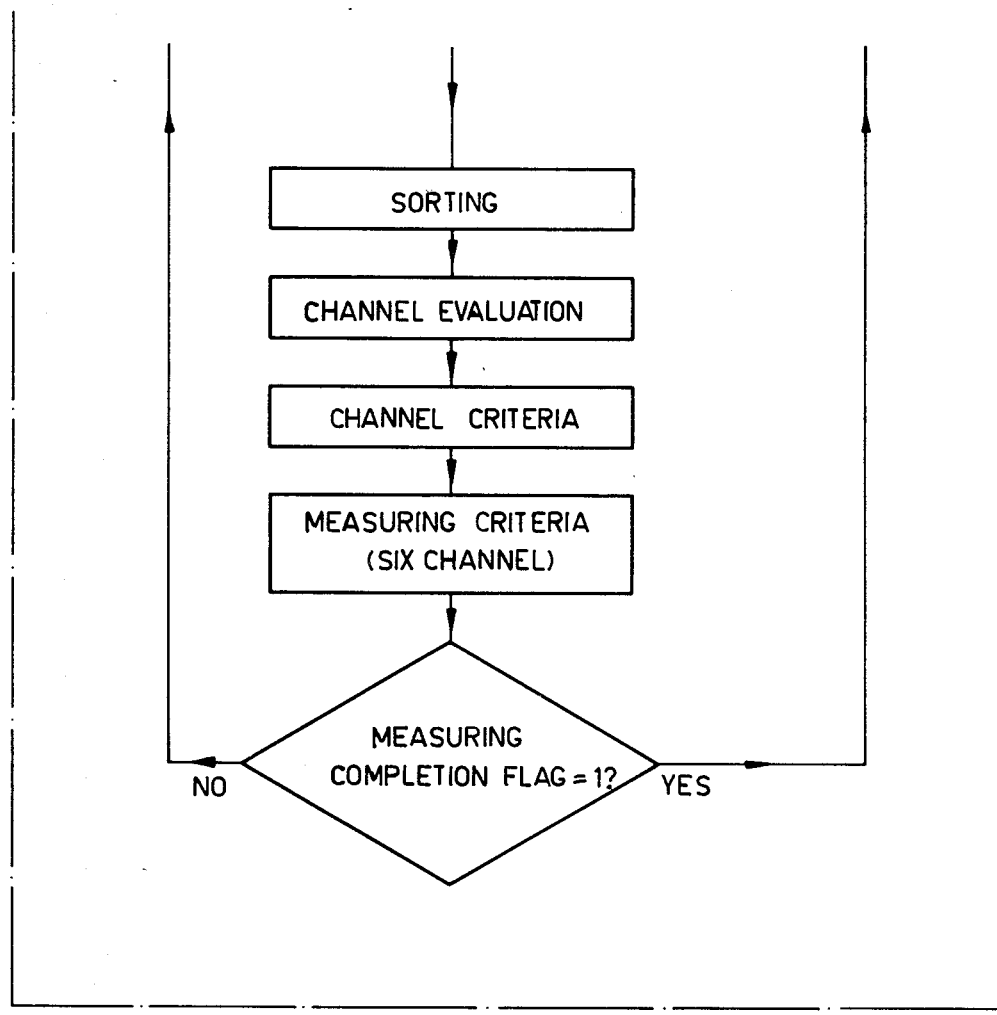
Figure 14:
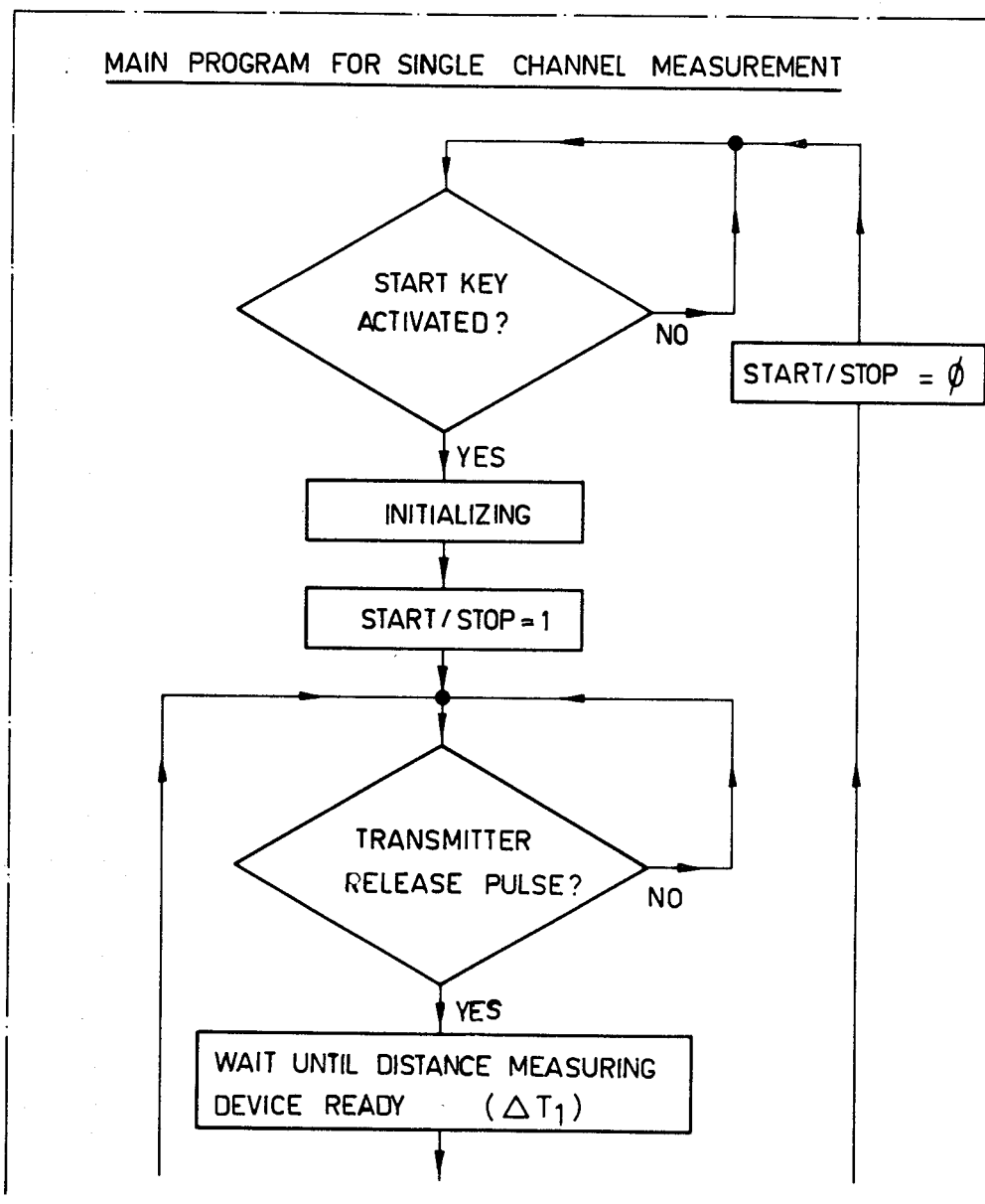

FIGS. 14-1/14-2 illustrate a flow chart of the main program for a six-channel measurement. The therein portrayed course or sequence of the program can be explained as follows: In the rest condition there is continuously interrogated the state of the input 132a of the microcomputer 120 which is coupled with the start button or key 129. As long as this start button 129 is not depressed or activated, then the apparatus remains in its rest condition.

Upon activating or depressing the start button 129 there is altered the logic state prevailing at the aforementioned input 132a, and this change acts as a signal for the start of a measurement operation.

As a first step there is thereafter undertaken the so-called initializing. Hence, all of the memory or storage places in the random access memory 136 needed for data processing are extinguished. For instance, the velocity display originating from the preceding measurement is extinguished, and a timing device or timer is reset. The timing device or timer is constituted by a register or storage of the random acess memory 136 of the microcomputer 120 and which has a certain storage capacity. By means of the start-stop line 125 (FIG. 11A) a signal possessing the logic state "1" is delivered to the transmitter trigger and drive regulation circuit or control 123, so that, as previously explained, there is started-up the drive motor M of the beam deflection device or unit 102.

As the next step there is checked the transmitter trigger or release line 126 and an occurring transmitter trigger or release signal is read-in. After each such checking operation a timing device or timer contained in the microcomputer 120 is incrementized or indexed by one unit. As soon as there has been determined the presence of a transmitter trigger pulse, then the counter state of such timing device provides information concerning the expired waiting time until the arrival of such transmitter trigger pulse. As will be explained more fully hereinafter, this counter state is needed for a sorting program.

After a certain time span $\Delta T_1$ following the determination of the presence of a transmitter trigger pulse there is delivered a conversion command to the analog-to-digital converter 119A by means of the output 132d of the microcomputer 120. After expiration of a further time span $\Delta T_2$ there is read-in by means of the microcomputer 120 the digitized distance value which has then been delivered by the analog-to-digital converter 119A. Now there is present the task of correlating the read-in distance value to the correct measuring channel MK. This correlation occurs during the course of the sorting program which will be explained more fully hereinafter.

After there has been determined during the course of the sorting program the channel number K which belongs to the last distance measuring value, there then can be evaluated such distance measuring value. This occurs in accordance with a channel evaluation program which likewise will be explained more fully hereinafter. Consequently, the last obtained distance measuring value is brought into correlation with the distance measuring values which, in the meantime, have been stored and are already contained in the same channel. After this evaluation of the distance measuring value, the information or data which has arrived and has been evaluated up to then in the relevant channel is then checked in accordance with certain criteria. This part of the program is designated as "channel criteria", and it too likewise will be explained more fully hereinafter.

The grouping together of the information which has thus far been obtained by means of all of the measuring channels and its evaluation or assessment according to certain further criteria occurs in the part of the program referred to as "measuring criteria".

In this part of the program there is decided whether the measurement should be continued or whether it is completed, and equally, whether it is successful or unsuccessful. If the measurement should be further continued, then there is set a "measuring completion flag = $\emptyset$". On the other hand, if the measurement should be terminated, then there is set the "measuring completion flag = 1".

If the evaluation or assessment determines that the measurement should be further carried out, then there is extinguished the aforementioned timing device, and there is initiated a new measuring operation or cycle. After determining the presence of the next transmitter trigger pulse there is again carried out the same procedure as previously described. On the other hand, if the measurement is interrupted, then there is delivered a logic signal "0" to the start-stop line 125, and the measuring apparatus is then reset into its rest state.

Figures 2, 14A:
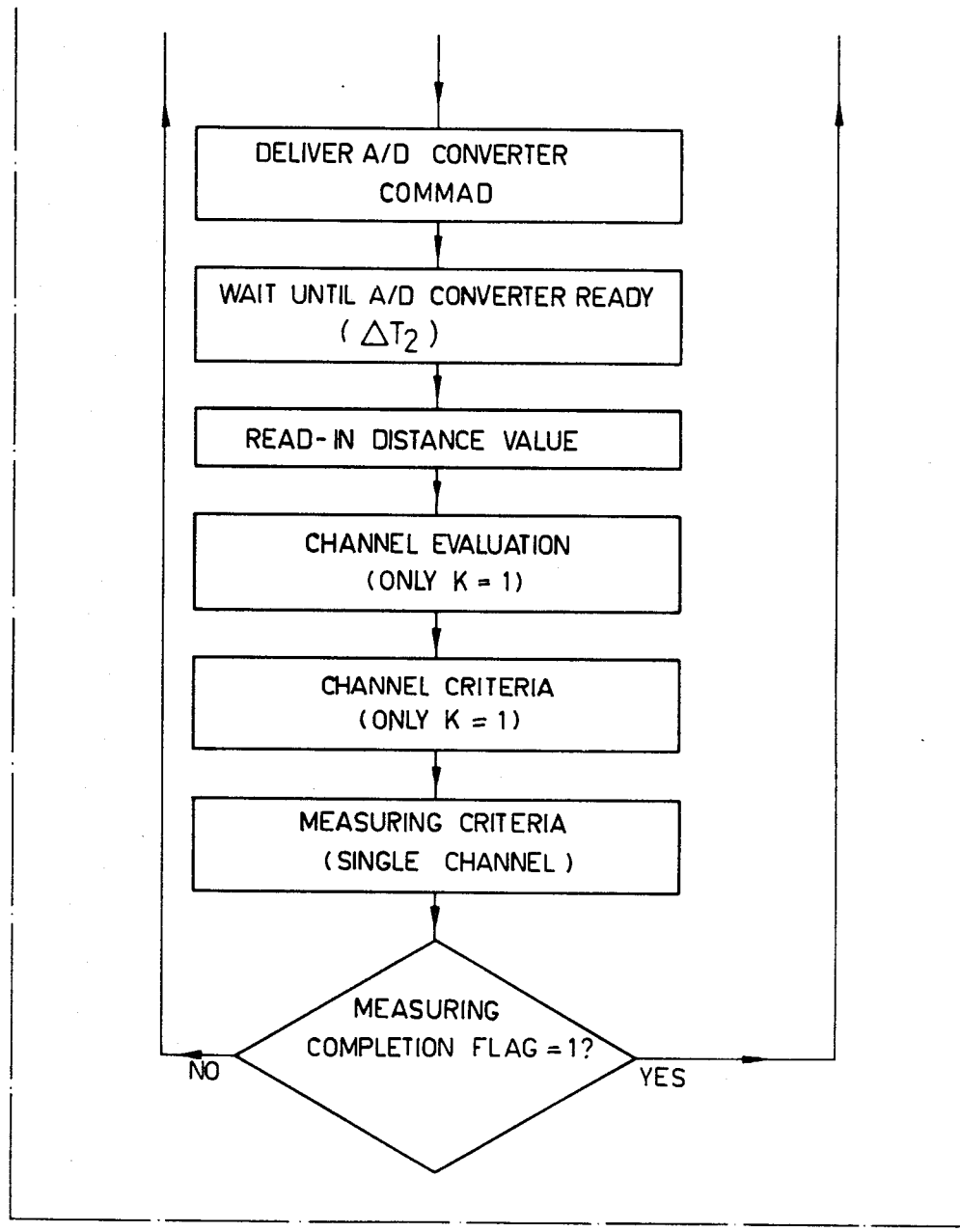

In FIGS. 14A-1/14A-2 there has been depicted a flow chart of the main program for a single-channel measurement. Based upon the foregoing explanations made with reference to the flow chart of FIGS. 14-1 and 14-2 the sequence of steps or operations will be readily apparent.

Figure 15:
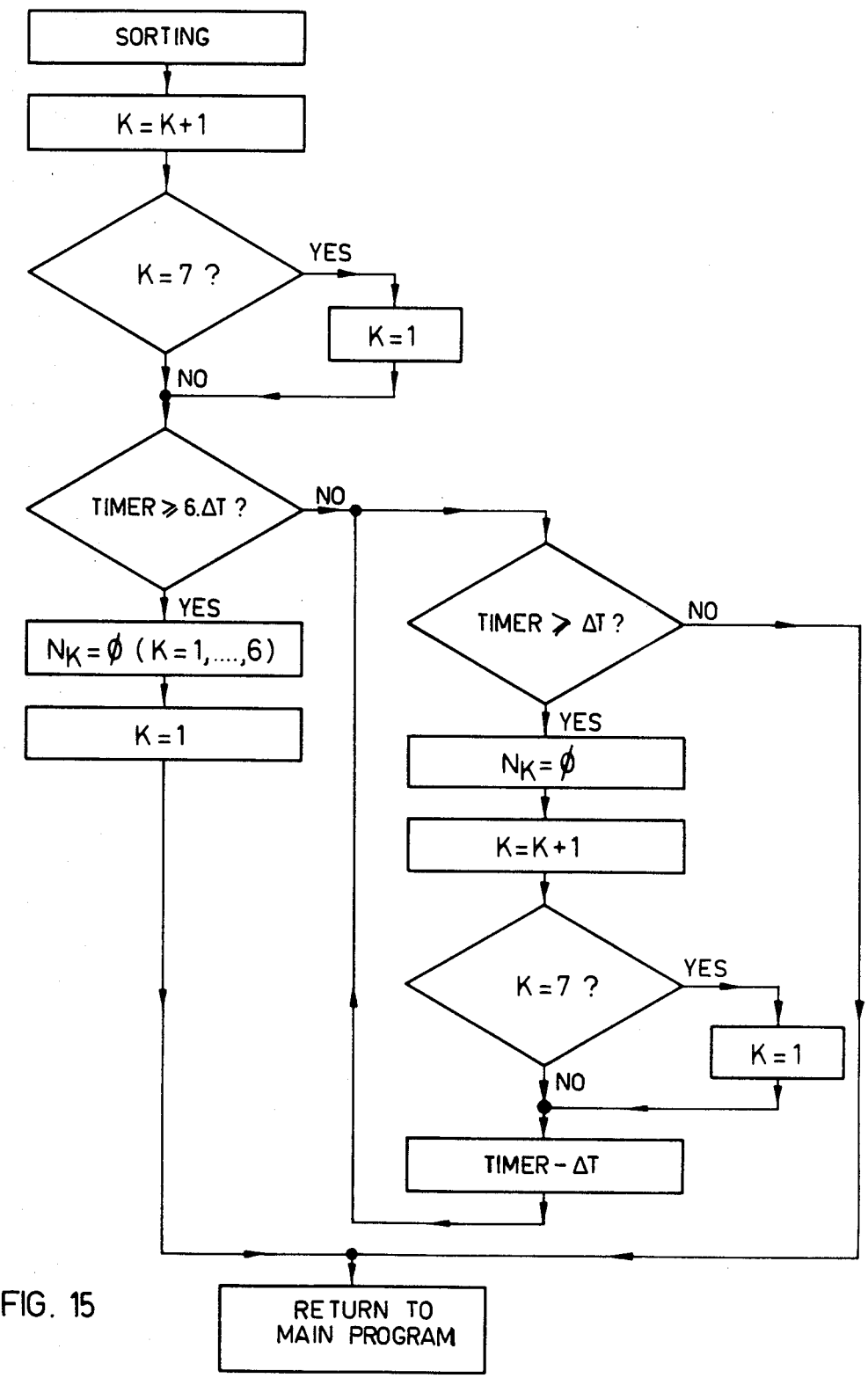
FIG. 15 is a flow chart of the sorting program.

FIG. 15 illustrates a flow chart of the previously mentioned sorting program. As already explained, the sorting program fulfills the task of correlating the last read-in distance measuring value to the correct channel. In the normal case successive distance measuring values belong to cyclically successive channels. Above all, at the starting or initial phase of a measurement, in other words when the rotational speed regulation of the beam deflection device 102 has not yet completely attained its stable state, it can happen, for instance, due to overshooting of the regulation operation that, because of too large deviations which momentarily occur one or a number of distance measurements will be omitted due to suppression of the relevant transmitter trigger pulse. Also, a possibly arising non-observance of detection markers DM at the detection disk DS by the light barrier LS would lead to suppression of corresponding transmitter trigger pulses, so that there could arise gaps in the transmitter trigger pulse sequence or train. These gaps must be absolutely detected in order to take into account in the channel correlation the prevailing measuring values.

The sorting program, as apparent from FIG. 15, functions as follows: Initially the channel number is increased by one unit and there is made certain that following the number six is the number one. Thereafter, there is read-in the content of the timing device. If this content is greater than $6 \times \Delta T$, wherein $\Delta T$ corresponds to the normal time interval of the transmitter trigger pulse sequence, i.e. the time interval from pulse to pulse, then in all probability one is dealing with the first transmitter trigger pulse of a measuring sequence. In this case the measuring numbers $N_K$ of all channels (K = 1 to 6) are set to null ($\emptyset$) and the channel number K is set to the value one. On the other hand, if the timing device content was smaller than $6 \times \Delta T$, then there is checked whether it is greater than $\Delta T$. If that is so then a gap was present in the detected transmitter trigger pulse sequence, and accordingly, there is missing a distance measuring value in the prevailing channel. In such case the measuring sequence in this channel must be started anew, and also there must extinguished all measuring values previously read into such channel, which measuring values have not yet withstood the hereinafter to be described reliability check or test. The measuring number of the checked measuring channel is then again set to null ($\emptyset$). Thereafter, the measuring number is cyclically increased, because the prevailing measuring value must be correlated to a subsequent channel owing to the determined gap. The timing device state is thereafter reduced by the value $\Delta T$, and the comparison of the timing device state or content with the value $\Delta T$ is repeated.

If for a determined gap in a transmitter trigger pulse sequence such constitutes the absence of a number of successive pulses, then also now, i.e. after the subtraction of $\Delta T$, there must be determined that the timing device content is greater than $\Delta T$. It is therefore necessary to once more set the measuring number of the prevailing channel to the value null ($\emptyset$) and, at the same time, there must be increased the channel number. This process is automatically continued until there has been passed through a number of channels corresponding to the actual magnitude of the gap in the pulse sequence. After such condition has been reached the timing device content is smaller than $\Delta T$, and therefore the number K of the channel, which must be correlated to the last distance measuring value, has been attained. This number K constitutes the result of the sorting program, and by means of such number in the relevant memory or storage place there subsequently occurs the jumping back or return into the main program.

Figures 1, 16:
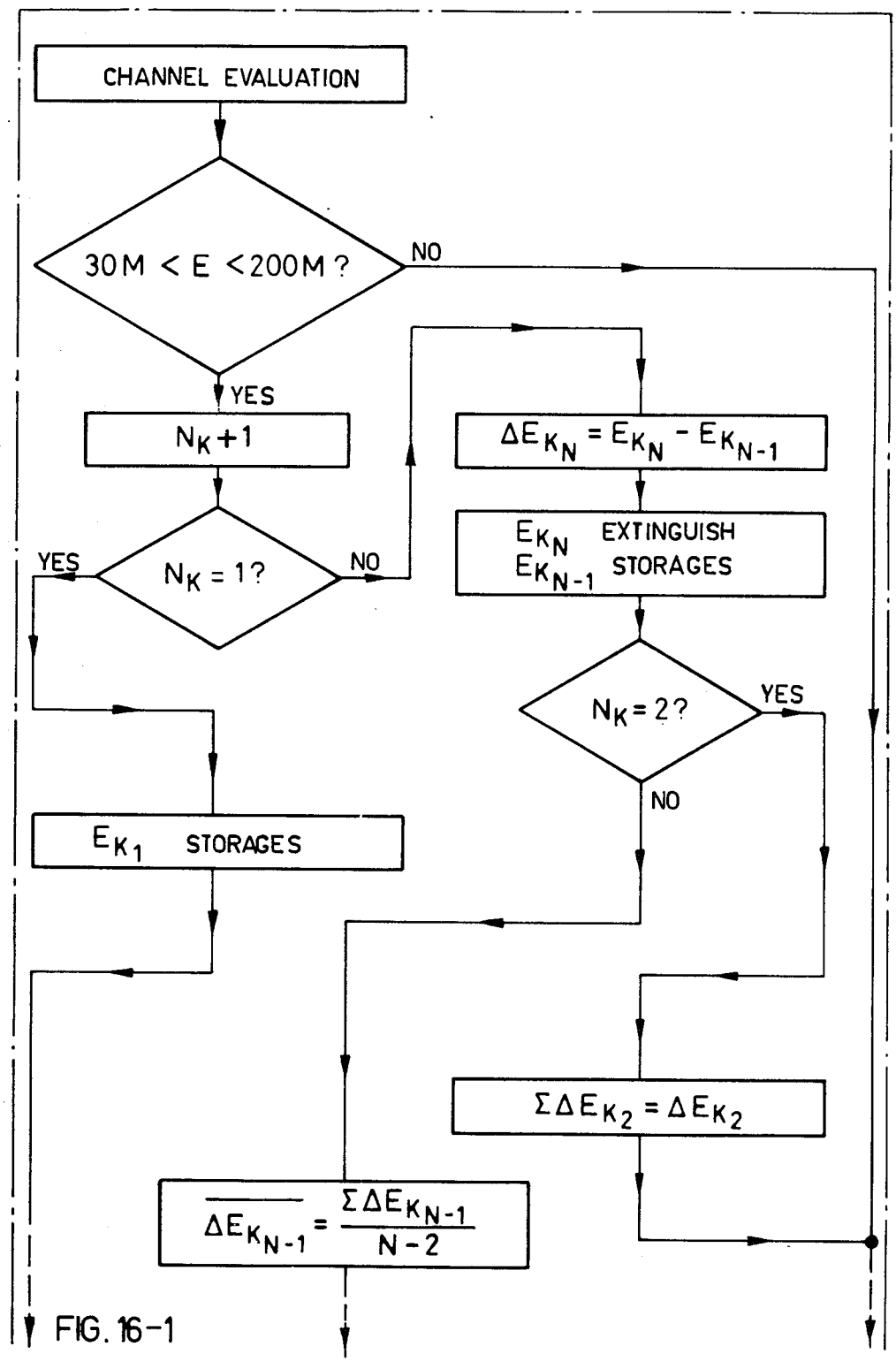
Figures 2, 16:
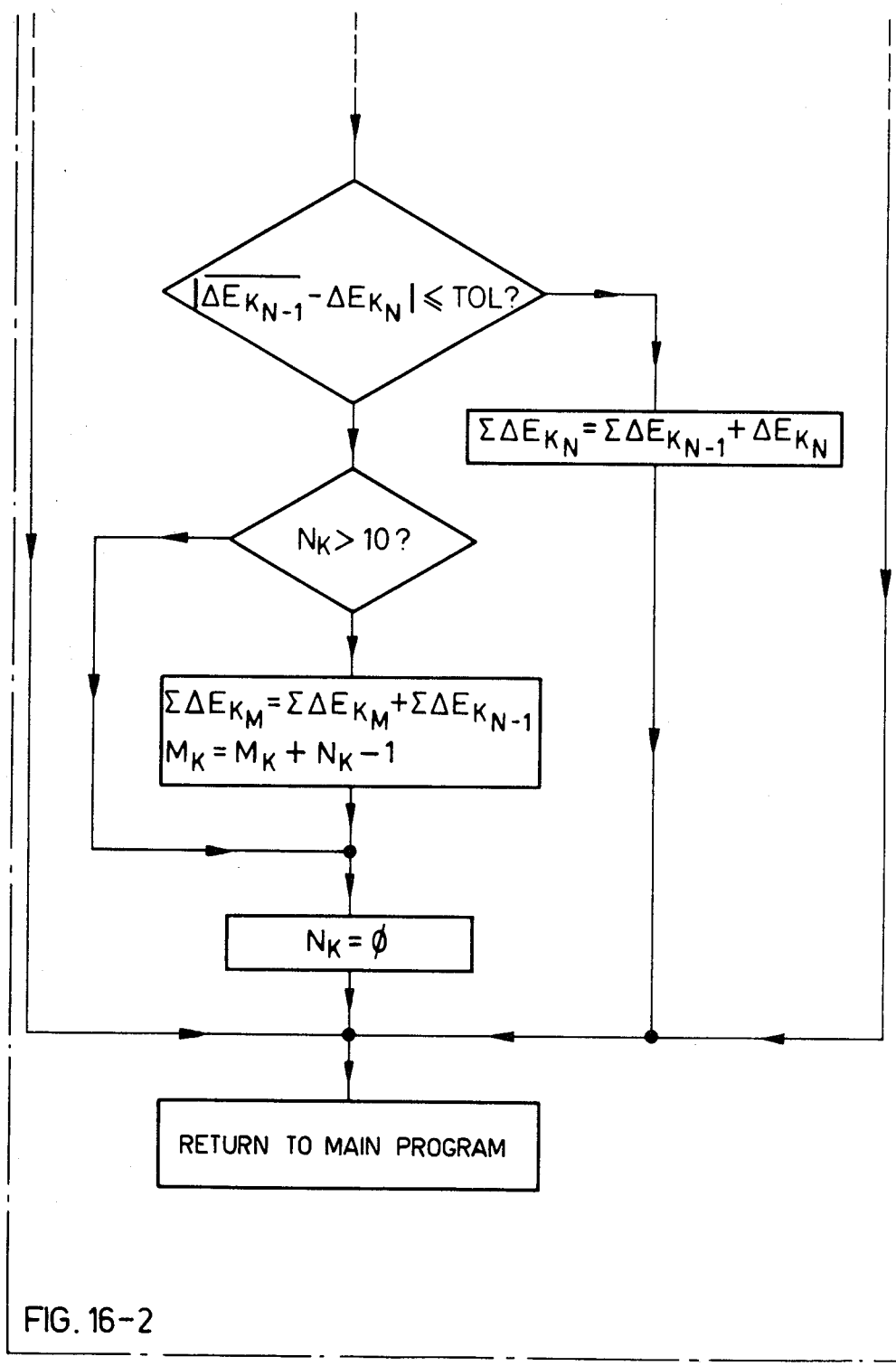

After there has been determined the channel number, there then occurs the channel evaluation according to the flow chart of FIGS. 16-1/16-2. The last-measured distance value together with the previous distance values measured in the same channel are processed into a total result. As the first step there is checked whether the measured distance value is located within a previously assumed measuring range. This assumed measuring range encompasses that distance range within which, in a given case, there can be expected sensible measurements. For instance, this assumed measuring range embraces distance values within 30 to 200 meters.

If a measured distance is outside of this assumed measuring range, then there is foregone its further evaluation, and there immediately occurs a return or jumping back into the main program. However, if the measured distance lies within the assumed measuring range, then there is initially increased the measuring number of the relevant channel $N_K$ by one unit. In the event there is satisfied $N_K = 1$ then apparently such constitutes the first measurement within a closed group of measurements of this channel, and after storage of such first distance measuring value $E_K$ there is accomplished a return back into the main program.

However, if $N_K \neq 1$, then there is formed and stored the difference between $E_{KN}$ and the distance measuring value $E_{KN-1}$, previously measured in the same channel, in other words $\Delta E_{KN}$ is formed and stored. Once this has been accomplished then there can be extinguished the previous value $E_{KN-1}$. On the other hand, $E_{KN}$ remains stored for the corresponding formation of a difference value after the arrival of the next distance measuring value.

If $N_K = 2$, then there is only now present a distance difference value $\Delta E_{K2}$ which now is stored as the sum of the previously formed distance difference value $\Sigma \Delta E_{K2}$. In this case there is thereafter directly carried out the jump back into the main program.

In the event $N_K - 2$, then there is initially checked whether the newly formed difference value $\Delta E_{KN}$ does not deviate more markedly from the average or mean of the difference values previously measured in the same channel than such could be governed by the distance measuring tolerance.

To this end there is formed the mean of the previously measured difference values $$\overline{\Delta E}_{K,N-1} = \frac{\Sigma E_{K n-1}}{N-2}$$

If the absolute value of the difference $$\overline{\Delta E}_{K,N-1} - \Delta E_{K,N}$$

is smaller than the tolerance governed by the distance measurement, then the newly formed difference value $\Delta E_{KN}$ forms a homogeneous group with the previously formed difference values $\Delta E_K$ to $\Delta E_{K,N-1}$, and it therefore can be accepted in such group.

There is then formed the new difference value sum $$\Sigma \Delta E_{K,N} = \Sigma \Delta E_{K,N-1} + \Delta E_{K,N}$$

which, during the checking of the next difference value in the same channel, is decisive for its acceptance in the homogeneous group. Thereafter there, is completed the jump into the main program.

If the absolute value of the difference $$\overline{\Delta E}_{K,N-1} - \Delta E_{K,N}$$

is greater than the tolerance governed by the distance measurement, then there is present an additional error source for the distance measurement, probably caused by the non-gapless optical tracking of the object or target which is to be measured. Thus, the measuring beam, upon which there can be predicated the aforementioned error, has hit or impinged during the last distance measurement a different part of the object to be measured than was the case during the prior distance measurements over the same measuring channel. The new difference measuring value $\Delta E_{KN}$, in this case, is not homogeneous with the previously formed difference values $\Delta E_{K2}$ to $\Delta E_{K,N-1}$ and therefore can not be accepted into the group of such difference values.

What now occurs with these remaining groups of difference values $\Delta E_{K2}$ to $\Delta E_{K,N-1}$ is dependent upon the number of difference values in such group $(N-2)$. In the embodiment under discussion there is assumed to be just still too small a group magnitude of eight elements for $N_K = 10$ for the formation of a value which can be contributed to a stored partial result $\Sigma \Delta E_{KM}$.

Only when $N_K$ is greater than 10 will, in this case, there be considered a group of difference values large enough for forming a representative value for the total measurement. With smaller groups the randomness could play too great a role. The actual selection of such group magnitude depends, however, upon the momentary requirements placed upon the measuring accuracy. What is here important is the recognition that only larger homogeneous groups, based upon a direct successive sequence of measuring values, should be allowed to contribute to the end result of the measurement.

Dependent upon the magnitude of the group which has been stored up to this time there is now increased or, as the case may be, not increased the stored sum $\Sigma \Delta E_{KM}$, depending upon the magnitude of the group, by $\Sigma \Delta E_{K,N-1}$. In the first case the value $M_K$, that is to say, the number of distance values taken into account for the stored sum, is increased by $N_{K-1}$. In both instances, prior to jumping into the main program, the measuring number of the prevailing channel $N_K$ is set to null (∅), so that further measurements only can contribute to the formation of a new group.

Figure 17:
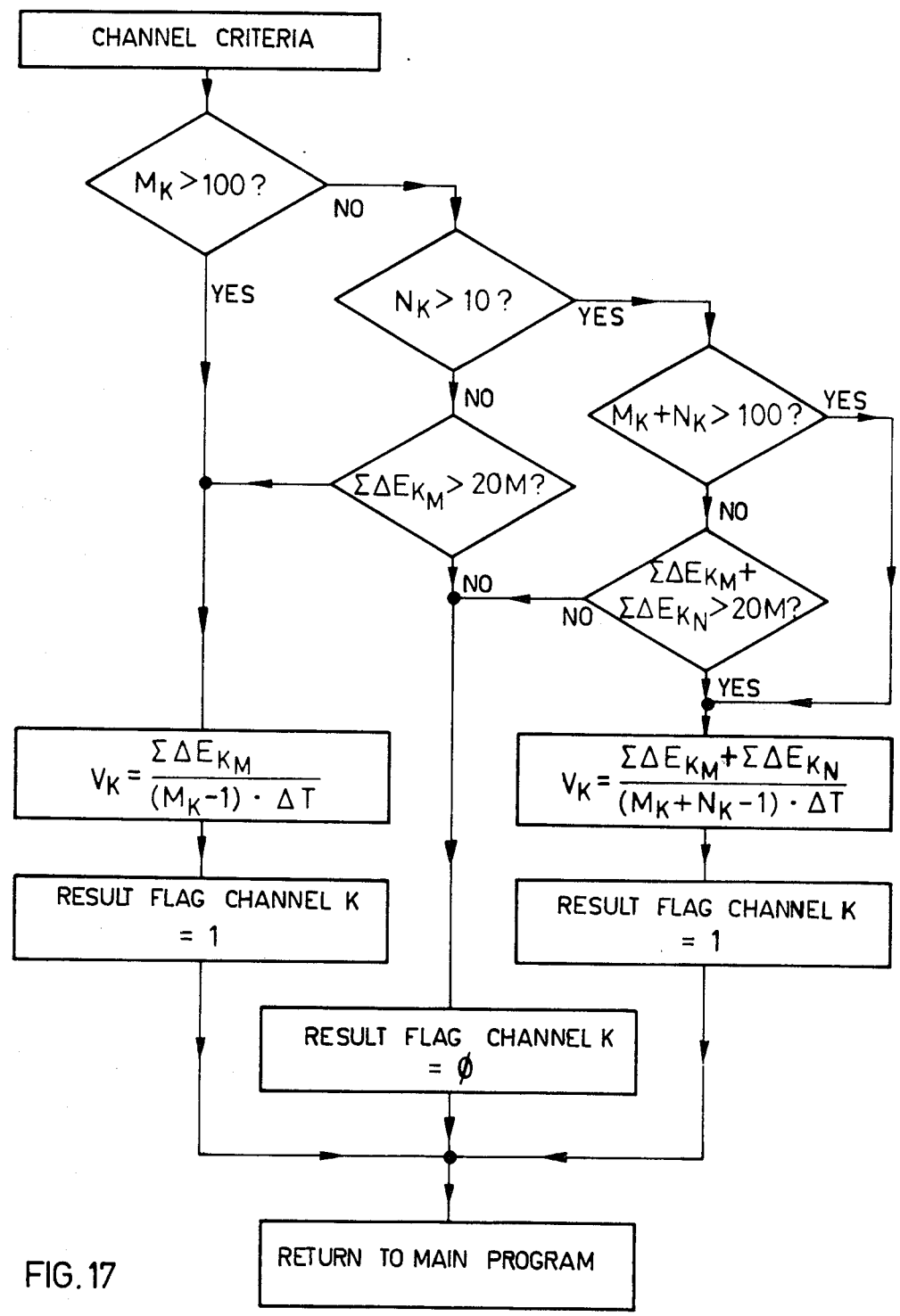
FIG. 17 is a flow chart for the determination of the channel criteria.

FIG. 17 illustrates a flow chart according to which the information obtained in a measuring channel, in accordance with the prior description, now can be assessed as concerns different criteria, in order to reliably satisfy certain requirements resulting in actual practice. A first criterion is constituted by the attainment of a certain number $M_K$ of distance difference values which, after having successfully undergone the homogenity check, can contribute to the stored sum $\Sigma \Delta E_{KM}$.

In the present embodiment there has been assumed for this purpose one hundred measurements. The magnitude of this number is dependent, on the one hand, upon the accuracy of the individual distance measuring values which can be realized by virtue of technical reasons and, on the other hand, upon the permissible tolerance for the velocity measuring value which finally is displayed.

If, in a practical case, the required number $M_K$ of successive homogeneous distance measuring values at least within groups has been realized, then based thereon there can be formed an end or final result, related to the relevant measuring channel, for a reliable velocity measuring value of the measured object or target. For forming this reliable velocity measuring value from the measurements obtained from a predetermined measuring channel, the stored sum $\Sigma \Delta E_{KM}$ is divided by the number $M_K - 1$ of the distance difference values which have been determined up to that point and by the time span $\Delta T$ needed in each instance for the formation of a distance difference value. Thus, there is obtained for the considered measuring channel K a useful result which, in the computation process of the microcomputer 120 can be expressed by setting a "result flag = 1". Thereafter there occurs the jumping back or return into the main program.

As will be recognized from the flow chart of FIG. 17, in the case where $M_K$ is not greater than one hundred, it is necessary to check, as a further step, whether $N_K$, that is the number of measurements which have been read into the running group of the channel K up to that point in time, is at least greater than 10. If that is the case then there is further checked whether $M_K + N_K$ is greater than one hundred, and if that is so, then in the following step there is formed the velocity measuring value resulting for the relevant channel K according to the equation:

$$V_K = \frac{\Sigma \Delta E_{KM} + \Sigma \Delta E_{KN}}{(M_K + N_K - 1) \cdot \Delta T}$$

and such is stored as the result of this channel and marked by setting the "result flag channel K=1". Thereafter, there occurs the jump back into the main program.

On the other hand, if during the program course according to the flow chart of FIG. 17 there is not fulfilled the condition that $N_K$ is greater than 10, then nonetheless there still exists the possibility of forming a reliable velocity measuring value $V_K$ if at least the previously stored sum of the distance difference values $\Sigma \Delta E_{KM}$ has reached a predetermined minimum value. The magnitude of this minimum value is dependent, on the one hand, upon the accuracy of the distance measurement and, on the other hand, upon the permissible tolerance for the velocity measuring value which is to be determined.

The value 20 meters is here assumed as a practically sensible value. The fulfilment of this condition means that the measured object or target, during the sum of the time spans during which there has occurred the related distance measuring values $\Sigma \Delta E_{KM}$, has moved through a distance of at least 20 meters.

Rapidly travelling vehicles move through a greater distance than slowly travelling vehicles until attaining a given number of stored distance difference values $M_K$. For the tolerance of the final or end result the distance or path moved through during the measurement must be related to the tolerance of the distance measurement. While for slowly travelling vehicles there is attained an absolute tolerance of the velocity measurement upon reaching a predetermined number $M_K$ of homogeneous distance difference measurements, in the case of rapidly travelling vehicles there is attained a relative measuring tolerance with respect to the velocity after reaching a predetermined magnitude of the stored sum of homogeneous distance differences $\Sigma \Delta E_{KM}$. In the event that there is fulfilled the condition that $N_K$ is greater than ten, then for the determination of the distance over which there occur reliable (homogeneous) distance difference values, there is employed to $\Sigma \Delta E_{KM} + \Sigma \Delta E_{KN}$.

If therefore there is not fulfilled the condition that $M_K$ is greater than one hundred, or the condition that $M_K + N_K$ is greater than one hundred, then there can be checked whether there has been fulfilled the condition $\Sigma \Delta E_{KM}$ is greater than 20 meters or if $\Sigma \Delta E_{KM} + \Sigma \Delta E_{KN}$ is greater than 20 meters. If one of these two conditions has been fulfilled, then there still can be determined a reliable velocity value $V_K$ for the relevant channel.

By means of the just described measures there is achieved the result that, with the greatest possible reliability under the practical conditions a velocity measuring value is formed from numerous measuring results which originate from a predetermined measuring channel MK. Thus, within the events occurring in such measuring channel there have been undertaken the possible precautions that, notwithstanding the practically unavoidable jump of the measuring beam to different reflection locations at the object or target to be measured, there does not arise any impairment in the accuracy of the result, and thus, the reliability of the finally computed velocity measuring value.

Since a measured velocity value, if it demonstrates that there has been exceeded a prescribed maximum velocity, can result in fines or punishment for the driver and such possible fines or punishment usually are subject to a court or other proceeding, in many instances a mere reliability of such measured velocity value is not legally sufficient or binding. There must be strived for a greater degree of legal acceptability of the velocity value which has been determined for the measured object or vehicle, as the case may be.

By the use of further measures as contemplated by the invention, there can be obtained such enhanced acceptance or legal bindingness. Already previously during the use of, for instance, Doppler radar velocity measuring devices there was foregone the recording of all those measuring results where there could possibly arise justifiable doubt as to their validity, in the interest of increasing the acceptance of an ultimately recorded measuring result by the court or the like. However, this resulted in the fact that, frequently an undesirably large percentage of traffic violators were not ticketed or prosecuted because of the possibility of legally challenging the relevant velocity measurement.

As already previously explained it is a primary task of the invention to also eliminate this shortcoming and to only eliminate truly doubtful situations if such are really justified.

The purpose of the previously described multi-channel measurement, for instance by means of six measuring channels, which in their totality detect the object or target to be measured, or the vehicle, as the case may be, particularly resides in confirming the measuring result from one channel by at least one further similar measuring result from a further measuring channel, meaning other measuring channels.

The previously described multi-channel measuring apparatus, where measuring beams are cyclically transmitted to the object or target to be measured in a series of measuring channels and reflections at such object are evaluated in different measuring channels, renders it possible, on the one hand, to eliminate further error sources which could render questionable the validity of a displayed measuring result and, on the other hand, to use measurements from at least one further measuring channel as a confirmation or, in fact, a multiple confirmation of the measurements received from the first measuring channel.

As such error sources there must be considered the possibility that measuring beams, which in fact are directed to the predetermined movable target or object, can move past such object because of at least periodic directional variations or, respectively, because of inaccurate optical alignment of the equipment at such object, and, possibly can be reflected at a different moving object or vehicle. Such other vehicle could be, for instance, a vehicle which for instance is just in the process of passing the desired target vehicle, and therefore, possesses a greater velocity than such target vehicle.

If unknowingly measuring results from one or, in fact, a number of other measuring channels impinge such vehicle, then without the provision of special measures the police officer or other official carrying out the measurement operation could unintentionally ascribe false velocity measuring values to the target vehicle or driver who such officer or official was intentionally tracking, something which of course should not occur.

Figure 18:
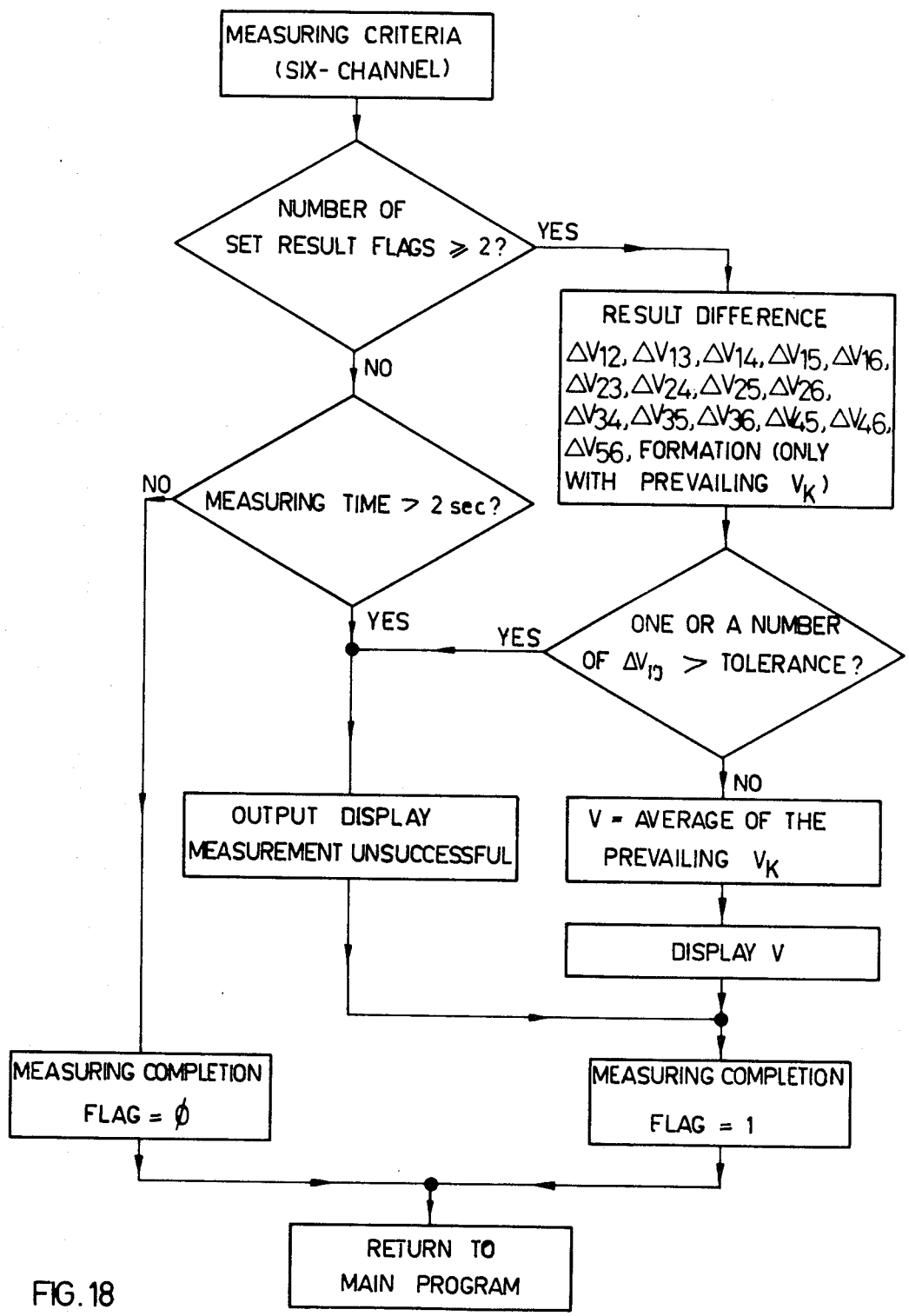
FIG. 18 is a flow chart for the measurement criteria with six-channel measurement.

With the now to be described, for instance six-channel measurement, and based upon the flow chart of FIG. 18, the procedures which are carried out are the following:

Initially, there is checked whether from a sufficient number of, for instance at least two different measuring channels, there have been obtained reliable velocity values. If this condition is not fulfilled then there is decided whether the related measurement operation should be continued or whether it is to be discontinued because it was unsuccessful.

Initially, there is thus checked whether and if so, how many "channel result flag=1" have been set, in other words in how many channels has there occurred a reliable measuring value.

If, for instance, there have been set less than two such "channel result flag=1", then there is further checked the amount of time during which the related measurement already has taken place. As an acceptable threshold for this purpose there is assumed, for instance, a time interval of two seconds. Depending upon the field of application it is, however, also sensible to choose a different time span or interval.

Now, if in the case under consideration the velocity measurement has already been carried out during two seconds without there having been obtained a reliable measuring value, then the velocity measurement operation in progress is discontinued because it is considered to be unsuccessful. This fact is signaled to the operator of the measuring apparatus by means of a special display, for instance a signal light or lamp or by outputting a fictitious velocity value amounting to null. Before the jump back into the main program there is set a "measuring completion flag=1".

The previously described main program, as will be recalled by referring to the flow chart of FIG. 14, checks such "measuring completion flag" and determines the further functional operations or steps based upon its value.

If the assumed measuring time span of two seconds has not been exceeded, then the "measuring completion flag" is set to null (∅) prior to jumping back into the main program (FIG. 14).

If, however, there have been set two or more "channel result flag=1", then the corresponding channel results are compared with one another. If there are determined deviations which can not be explained by the normal measuring tolerances, then there is assumed that at least two moving objects, in other words here vehicles, have been at least timewise detected during the course of the measurement operation performed by the apparatus and its measuring beams, respectively.

Although the different vehicles were reliably measured in each case per channel, there is however not possible an unambiguous correlation of the relevant measuring result to a predetermined sighted or targeted vehicle.

Because of the then inadequate reliability of the measuring or measurement result, in this case therefore all of these measuring results are annihilated or extinguished. Furthermore, in this case there is signaled to the operator of the measuring apparatus that there has occcurred an unsuccessful measurement. Also now there is set the "measuring completion flag=1" prior to jumping back into the main program (FIG. 14).

On the other hand, if the deviations determined during comparison of the measuring results from different channels are so small that they can be attributed to the known measuring tolerance, then there is deemed to be present a legally binding measurement of a single vehicle. The correlation of a legally binding velocity measuring value with the target vehicle which can be identified in the sighting device of the measuring apparatus is therefore faultlessly realized.

Thereafter, there is formed from the measuring values emanating from the channels which have successfully passed this test the mean value and such is displayed in the display device of the apparatus as a legally binding velocity measuring value of the measured target vehicle.

The "measuring completion flag" is then set to equal 1 and there is completed the return back into the main program of FIG. 14.

As already previously explained, even upon once checking the moving object or target by means of only one measuring channel there can be obtained a greater reliability of the velocity measurement in relation to state-of-the-art techniques. For certain fields of application, for instance when measuring distances up to approximately 100 meters, it is completely possible to master, with careful handling of the measuring apparatus, the problem of correct correlation of a measuring value to a vehicle. This is particularly then the case if through the use of high-grade optical systems there can be imaged at the vehicle whose velocity is to be measured or checked a small light spot in relation to the vehicle silhouette and if also the sighting or tracking device allows for a good observation and recognition of the target vehicle which is to be measured and optically tracked.

Such a single-channel velocity measuring apparatus requires a modest technical expenditure, and therefore, can be completely satisfactory for certain cases or fields of application.

Figure 19:
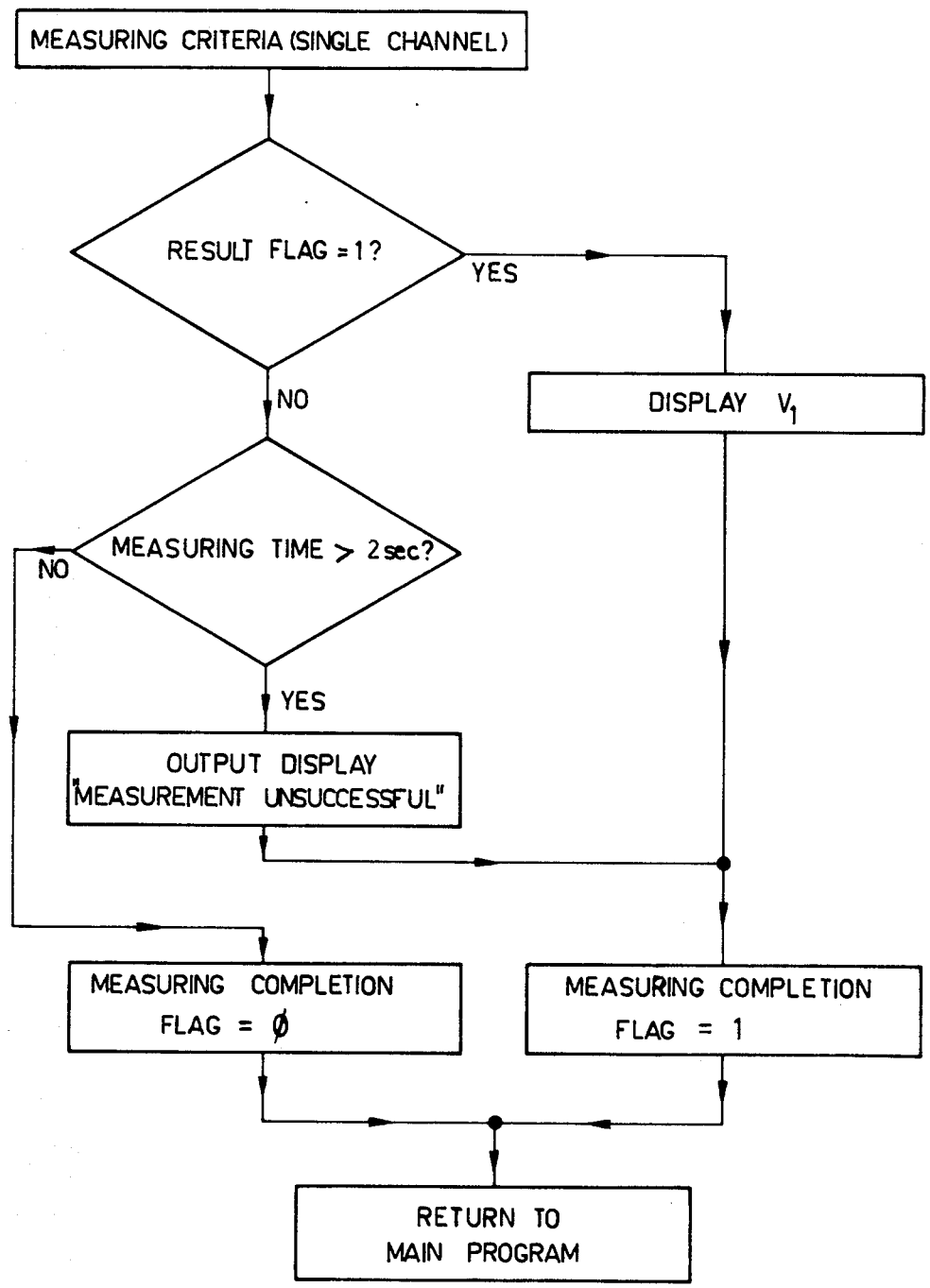
FIG. 19 is a flow chart for the measuring criteria with a single-channel measurement.

Now FIG. 19 illustrates a flow chart for the measuring criteria which are utilized in the case of a single-channel measurement.

Initially, there is checked whether the "result-flag" of the single measuring channel has already been set. If this is so then the determined velocity value is displayed and the "measuring completion flag=1" is set. Thereafter, there occurs the jumping back or return into the main program (see FIG. 14A).

On the other hand, if there has not yet been set the "result flag=1", then there is checked the measuring time which has expired up to this point in time. If the expired measuring time has exceeded a limit of, for instance, two seconds, then the measurement is signalled as constituting an unsuccessful measurement, for instance there is displayed the fictitious value null (∅). Prior to returning into the main program (see FIG. 14A) there is set the "measuring completion flag=1". On the other hand, if the aforementioned limit concerning the measuring time has not yet been reached, then the measurement is continued. To that end prior to jumping back into the main program there is set the "measuring completion flag=0 (∅)".

While there are shown and described present preferred embodiments of the invention, it is to be distinctly understood that the invention is not limited thereto, but may be otherwise variously embodied and practiced within the scope of the following claims. Accordingly,

What we claim is:

1. A method of measuring the velocity of a moving object by means of pulsed optical radiation, comprising the steps of:

forming at least one measuring beam from a sequence of optical pulses;

directing said at least one measuring beam towards the object whose velocity is to be measured;

determining the transit times of the at least one measuring beam to the object and its reflection at the object back to a site where the at least one measuring beam was transmitted;

forming distance values from the determined transit times and distance differences from the distance values;

dividing the distance differences by related time spans in order to form velocity values of the moving object to be measured;

selecting at least one of said time spans during which substantially constant values are formed of said velocity of the moving object and thus determining a reliable velocity value; and displaying said reliable velocity value.

2. The method as defined in claim 1, wherein:

said step of forming said at least one measuring beam entails the step of forming said at least one measuring beam from a sequence of substantially uniformly spaced optical pulses;

selecting at least one sequence of consecutive ones of said distance values and/or said distance differences and/or said velocity values in respect of their homogeneity; and computing reliable velocity values only upon fulfillment of predetermined homogeneity criteria.

3. The method as defined in claim 2, further including the steps of:

dividing the sum of said at least one sequence of homogeneous distance difference values by the sum of related time spans of relevant pulse sequences in order to compute said reliable velocity value.

4. The method as defined in claim 3, wherein:

said predetermined homogeneity criteria constitutes the fulfilled condition that all values of said at least one sequence of distance differences are located within a fixed absolute or relative tolerance range.

5. The method as defined in claim 2, further including the steps of:

selecting at least one sequence of a predetermined number of consecutive ones of said formed distance values which fall within a predetermined tolerance range and thus constitute homogeneous distance values;

forming from said selected at least one sequence of consecutive distance values at least one sequence of a predetermined number of consecutive distance differences which fall within a predetermined tolerance range and thus constitute homogeneous distance differences; and dividing the sum of said at least one sequence of homogeneous distance differences by the sum of related time spans of relevant pulse sequences in order to determine said reliable velocity value.

6. A method of measuring the velocity of a movable object by means of pulsed optical radiation, comprising the steps of:

forming measuring beams from a sequence of optical pulses;

directing the measuring beams towards the object whose velocity is to be measured;

determining the transit times of the measuring beams to the object and their reflection at the object back to a site where the measuring beams were transmitted;

forming distance values from the determined transit times and distance differences from the distance values;

dividing the distance differences by related time spans in order to form velocity values for the object to be measured;

displaying the formed velocity values;

transmitting to the object to be measured measuring beams over at least two different paths;

separately detecting the transit times of the pulses of such measuring beams along the aforementioned paths;

forming from these transit times the distance measuring values and from these distance measuring values distance differences;

computing reliable velocity values from these distance differences; and displaying the velocity values only then as binding velocity values when there have been fulfilled predetermined criteria by velocity values emanating from different directions.

7. The method as defined in claim 6, further including the steps of:

comparing with one another the velocity values emanating from different directions; and only then performing and displaying a binding measuring value when the difference of the velocity values emanating from different directions does not exceed a predetermined tolerance range.

8. The method as defined in claim 1, wherein:

said step of forming said at least one measuring beam entails the step of forming a predetermined number of spatially separate measuring beams each one of which is formed from said sequence of optical pulses;

the measuring beams formed from said sequence of optical pulses are produced by a single light source;

determining said reliable velocity value for different ones of said predetermined number of spatially separate measuring beams; and comparing said reliable velocity values associated with said different predetermined number of spatially separate measuring beams in order to determine reliable velocity values which have a predetermined interrelationship, each of which is associated with a different one of said predetermined number of spatially separate measuring beams and which thus constitute binding velocity values.

9. A method of measuring the velocity of a moving object by means of pulsed optical radiation, comprising the steps of:

generating from a single light source a plurality of discretely directed light pulses defining a plurality of measuring beams which are targeted towards a predetermined object whose velocity is to be measured;

forming from transit times of such pulses to the object and reflection thereof at the object back to a site where the measuring beams were transmitted distance values and from said distance values forming distance differences;

dividing the distance differences by related time spans in order to form velocity values for the object whose velocity is to be measured; and selecting at least one time span during which substantially constant values are formed of said velocity of said moving object.

10. An apparatus for measuring the velocity of a moving object by means of pulsed optical radiation, comprising:

a pulsed light source for furnishing pulsed optical radiation;

a transmitter optical system for transmitting the pulsed optical radiation towards the object to be measured;

said transmitter optical system having an optical axis;

a transparent disk rotatably arranged with respect to said optical axis between the pulsed light source and the transmitter optical system;

said transparent disk being inclined with respect to said optical axis;

said rotatably arranged transparent disk deflecting said measuring beams emanating from the light source into a predetermined number of different solid angle sectors each of which generates a differently located light spot at said moving object; and circuit means controlling said pulsed light source and evaluating pulsed radiation reflected from said moving opbject as well as determining and storing velocity values of said moving object for each one of said predetermined number of different solid angle sectors.

11. The apparatus as defined in claim 10, wherein:

said circuit means include a transmitter trigger and drive regulation circuit for the synchronization of transmitter trigger pulse sequences and for the rotation of the transparent disk; and said transmitter trigger and drive regulation circuit outputting transmitter trigger signals at a transmitter trigger frequency which is in a defined relationship to the rotational speed of the rotatable transparent disk.

12. An apparatus for measuring the velocity of a moving object by means of pulsed optical radiation, comprising:

a pulsed light source for furnishing pulsed optical radiation;

a transmitter optical system for transmitting the pulsed optical radiation towards the object to be measured;

said transmitter optical system having an optical axis;

a transparent disk rotatably arranged with respect to said optical axis between the pulsed light source and the transmitter optical system;

said transparent disk being inclined with respect to said optical axis;

said rotatably arranged transparent disk deflecting measuring beams emanating from the light source into different solid angle sectors;

a transmitter trigger and drive regulation circuit for the synchronization of transmitter trigger pulse sequences and for the rotation of the transparent disk;

said transmitter trigger and drive regulation circuit outputting transmitter trigger signals at a transmitter trigger frequency which is in a defined relationship to the rotational speed of the rotatable transparent disk;

said transmitter trigger and drive regulation circuit comprising:

a frequency-stable generator;

a frequency divider and frequency counter arranged in circuit after said frequency-stable generator;

said frequency counter serving to produce pulse sequences for a time grid;

drive means for rotating said transparent disk;

a light barrier for monitoring the rotation of the transparent disk;

said transmitter trigger and drive regulation circuit further comprising:

a phase comparator for comparing pulses of the light barrier monitoring the rotation of the transparent disk with pulses of the time grid;

said phase comparator having a regulation output and a control output;

a power amplifier;

said regulation output of said phase comparator being connected by means of said power amplifier with said drive means for said transparent disk;

said frequency counter having outputs;

two flip-flops each provided with inputs and outputs;

the control output of the phase comparator and the outputs of the frequency counter being connected with the inputs of said two flip-flops;

a first AND-gate and second AND-gate;

said second AND-gate having first and second inputs;

the outputs of the two flip-flops being connected by said first AND-gate with said first input of said second AND-gate;

the second input of said second AND-gate having inputted thereto a transmitter trigger pulse sequence from the frequency counter;

said second AND-gate being rendered conductive owing to logical linking of its inputted signals only upon synchronization of the rotation of the transparent disk with the time grid;

said transmitter trigger and drive regulation circuit having an output; and the output of the transmitter trigger and drive regulation circuit being connected with the light source.

13. A method of measuring the velocity of a moving object by means of pulsed optical radiation, comprising the steps of:

forming at least one measuring beam from a sequence of optical pulses;

directing said at least one measuring beam from a transmission site to the moving object whose velocity is to be measured;

receiving and evaluating said at least one measuring beam reflected by the moving object in order to determine transit times of the optical pulses forming said at least one measuring beam from said site of transmission to the moving object and back from the moving object to said site of transmission;

forming distance values from the determined transit times and distance differences from the distance values;

determining values of said velocity of said moving object by dividing the formed distance differences by related time spans of relevant pulse sequences;

said step of determining said velocity values including the steps of:

selecting sequences of successive distance values and successive distance differences, each of which successive distance values and successive distance differences falls within a related predetermined tolerance range and is measured at a substantially constant velocity of said moving object; and determining a reliable velocity value by dividing the sum of at least one such sequence of successive distance differences by the sum of related ones of said time spans.

14. The method as defined in claim 13, wherein:

said step of directing said at least one measuring beam from the transmission site to the moving object whose velocity is to be measured entails directing at least two spatially separate measuring beams towards said moving object;

said step of receiving and evaluating said at least one measuring beam reflected by said moving object entails the step of separately receiving and evaluating each one of said at least two spatially separate measuring beams in order to separately determine for each such measuring beam the related transit times;

said step of forming distance values from the determined transit times and forming distance differences from such distance values entails the step of separately forming distance values and distance differences for each one of said at least two spatially separate measuring beams;

said step of determining values of said velocity of said moving object entails the step of separately determining said reliable velocity for each one of said at least two spatially separate measuring beams; and determining as binding velocity values a predetermined number of reliable velocity values which originate from different ones of said at least two spatially separate measuring beams and which fall within a predetermined range of tolerance.

15. The method as defined in claim 14, wherein:

the step of directing said at least two spatially separate measuring beams towards said moving object encompasses directing in the range of 4 to 6 spatially separate measuring beams to the moving object whose velocity is to be measured.

16. The method as defined in claim 14, further including the step of:

automatically interrupting the velocity measurement when there are not obtained, after a predetermined duration of such measurement, at least two reliable velocity values which originate from different ones of said spatially separate measuring beams and which fall within said predetermined range of tolerance.

17. The method as defined in claim 14, wherein:

said step of determining said binding velocity value entails the steps of averaging the velocity values obtained from the different spatially separate measuring beams and falling within said predetermined range of tolerance; and considering the average velocity value thus obtained as said binding velocity value.

18. The method as defined in claim 13, wherein:

said step of forming said at least one measuring beam entails the step of forming said at least one measuring beam from a sequence of essentially uniformly spaced optical pulses.

19. An apparatus for measuring the velocity of a moving object by means of pulsed optical radiation, comprising:

a pulsed light source generating pulsed optical radiation;

a transmitter optical system transmitting said pulsed optical radiation towards the moving object whose velocity is to be measured;

said transmitter optical system having an optical axis;

a receiver optical system receiving reflected pulsed optical radiation from said moving object;

a receiver upon which said reflected pulsed optical radiation is directed by means of said receiver optical system;

said receiver receiving said reflected pulsed optical radiation after a transit time which depends upon the distance of said moving object from the velocity measuring apparatus;

circuit means operatively connected with said receiver in order to determine distance values of the moving object from said transit times, distance differences from such distance values, and velocity values of said moving object from the determined distance differences and transit times;

said circuit means temporarily storing a plurality of determined distance differences; and said circuit means further comprising means for comparing each new determined distance difference with said stored determined distance differences in order to obtain at least one sequence of consecutive such distance differences which fall within a predetermined range of tolerance and which are homogeneous with respect to the velocity of the moving object.

20. The apparatus as defined in claim 19, further including:

a transparent disk arranged for rotation with respect to said optical axis of said transmitter optical system and between said pulsed light source and said transmitter optical system;

said transparent disk being inclined with respect to said optical axis;

said transparent disk deflecting said pulsed optical radiation generated by said pulsed light source into a predetermined number of different solid angle sectors; and said circuit means storing said determined velocity values determined for each one of said predetermined number of different solid angle sectors and comparing said stored determined velocity values associated with different ones of said solid angle sectors.

21. The apparatus as defined in claim 20, further including:

a transmitter trigger and drive regulation circuit synchronizing said rotation of said transparent disk with a transmitter trigger pulse sequence which is in a defined relationship with the speed of said rotation of said transparent disk, and comprising:

a frequency-stable generator;

a frequency divider and frequency counter arranged in circuit after said frequency-stable generator;

said frequency counter serving to produce pulse sequences for a time grid;

drive means for rotating said transparent disk;

a light barrier for monitoring the rotation of the transparent disk;

a phase comparator for comparing pulses generated by means of the light barrier which monitors the rotation of the transparent disk, with pulses of the time grid;

said phase comparator having a regulation output and a control output;

a power amplifier;

said regulation output of said phase comparator being connected by means of said power amplifier with said drive means for said transparent disk;

said frequency counter having outputs;

two flip-flops each provided with inputs and outputs;

the control output of the phase comparator and the outputs of the frequency counter being connected with the inputs of said two flip-flops;

a first AND-gate and second AND-gate;

said second AND-gate having first and second inputs;

the outputs of the two flip-flops being connected by means of said first AND-gate with said first input of said second AND-gate;

the second input of said second AND-gate having inputted thereto a transmitter trigger pulse sequence from the frequency counter;

said second AND-gate being rendered conductive owing to logical linking of its inputted signals only upon synchronization of the rotation of the transparent disk with the time grid;

said transmitter trigger and drive regulation circuit having an output; and the output of the transmitter trigger and drive regulation circuit being connected with the light source.

22. The apparatus as defined in claim 19, wherein:
said pulsed light source generates a sequence of essentially uniformly spaced pulses of said optical radiation.

* * * * *

UNITED STATES PATENT AND TRADEMARK OFFICE
CERTIFICATE OF CORRECTION

PATENT NO. : 4,527,894
DATED : July 9, 1985
INVENTOR(S) : SIMON GOEDE et al

It is certified that error appears in the above—identified patent and that said Letters Patent is hereby corrected as shown below:

Column 5, line 2, after "a" and before "deflection" please insert --beam--

Column 11, line 21, please delete "L" (first occurrence) and insert --L'--

Column 25, line 8, please delete "$N_K$--2" and insert --$N_K \neq 2$--

Column 33, line 18, please delete "opbject" and insert --object--

Signed and Sealed this

Fifteenth Day of October 1985

[SEAL]

Attest:

Attesting Officer

DONALD J. QUIGG

Commissioner of Patents and Trademarks—Designate